US012632889B2

(12) United States Patent
Sardar et al.

(10) Patent No.: US 12,632,889 B2
(45) Date of Patent: May 19, 2026

(54) SYSTEMS AND METHODS FOR DYNAMICALLY DETERMINING EVENT CONTENT ITEMS

(71) Applicant: Valve Corporation, Bellevue, WA (US)

(72) Inventors: Adil Sardar, Seattle, WA (US); Alden Kroll, Seattle, WA (US)

(73) Assignee: Valve Software, Bellevue, WA (US)

( * ) Notice: Subject to any disclaimer, the term of this patent is extended or adjusted under 35 U.S.C. 154(b) by 285 days.

(21) Appl. No.: 18/180,307

(22) Filed: Mar. 8, 2023

(65) Prior Publication Data

US 2024/0303707 A1     Sep. 12, 2024

(51) Int. Cl.
*G06Q 30/00*     (2023.01)
*G06Q 30/0601*     (2023.01)

(52) U.S. Cl.
CPC ................................ *G06Q 30/0625* (2013.01)

(58) Field of Classification Search
None
See application file for complete search history.

(56) References Cited

U.S. PATENT DOCUMENTS

| | | | |
|---|---|---|---|
| 2012/0198045 A1 | 8/2012 | Sakata et al. | |
| 2013/0185292 A1 | 7/2013 | Li | |
| 2016/0203548 A1 | 7/2016 | Simmons et al. | |
| 2016/0275081 A1* | 9/2016 | Tian .................. | G06F 16/24578 |
| 2017/0236160 A1 | 8/2017 | Oberoi et al. | |
| 2017/0351977 A1* | 12/2017 | Bijor ...................... | G06Q 10/02 |
| 2018/0165697 A1 | 6/2018 | Stolorz | |
| 2018/0225367 A1 | 8/2018 | Glen et al. | |
| 2019/0354552 A1 | 11/2019 | Maharajh et al. | |
| 2021/0136165 A1 | 5/2021 | Werner et al. | |
| 2021/0144199 A1 | 5/2021 | Sherf et al. | |
| 2022/0027975 A1* | 1/2022 | Medalion ........... | G06Q 30/0617 |
| 2024/0303685 A1 | 9/2024 | Sardar et al. | |

OTHER PUBLICATIONS

Search Report and Written Opinion for International Application No. PCT/US2024/019030, dated Jul. 24, 2024, 14 pages.
Chamorro-Vela et al., "Recommendation of Mobile Applications based on social and contextual user information", retrieved from <<https://doi.org/10.1016/j.procs.2017.06.090>>, Procedia Computer Science, vol. 110, pp. 236-241.

(Continued)

*Primary Examiner* — Mila Airapetian
(74) *Attorney, Agent, or Firm* — Lee & Hayes, P.C.

(57) ABSTRACT

There may be large numbers of content items available at current content provider systems. Subsets of these content items may be eligible to participate in events, such as sales. A content provider system may determine content item eligibility for events using content item data and proactively query vendor systems for participation in such events. The content provider system may iteratively query vendor systems based on an ordered set of eligible content items. The content provider system may monitor content items for updated content items data and proactively query a vendor system if a content item becomes eligible for an event based on updated content item data. Content items associated with a sale may be sorted and presented to a user based on user and/or content item data.

20 Claims, 8 Drawing Sheets

(56)           References Cited

OTHER PUBLICATIONS

Office Action for U.S. Appl. No. 18/180,325, mailed on Apr. 2, 2024, Sardar et al., "Systems and Methods for Dynamically Determining Event Content Items", 16 pages.

Office Action for U.S. Appl. No. 18/180,325, Dated Jun. 4, 2025, Sardar, "Systems and Methods for Dynamically Determining Event Content Items," 10 pages.

PCT Search Report and Written Opinion for related International Application No. PCT/US2024/019034 dated Jun. 18, 2024, 17 pages.

PCT Search Report and Written Opinion for International Application No. PCT/US2024/019030, dated Jul. 24, 2024, 14 pages.

* cited by examiner

100

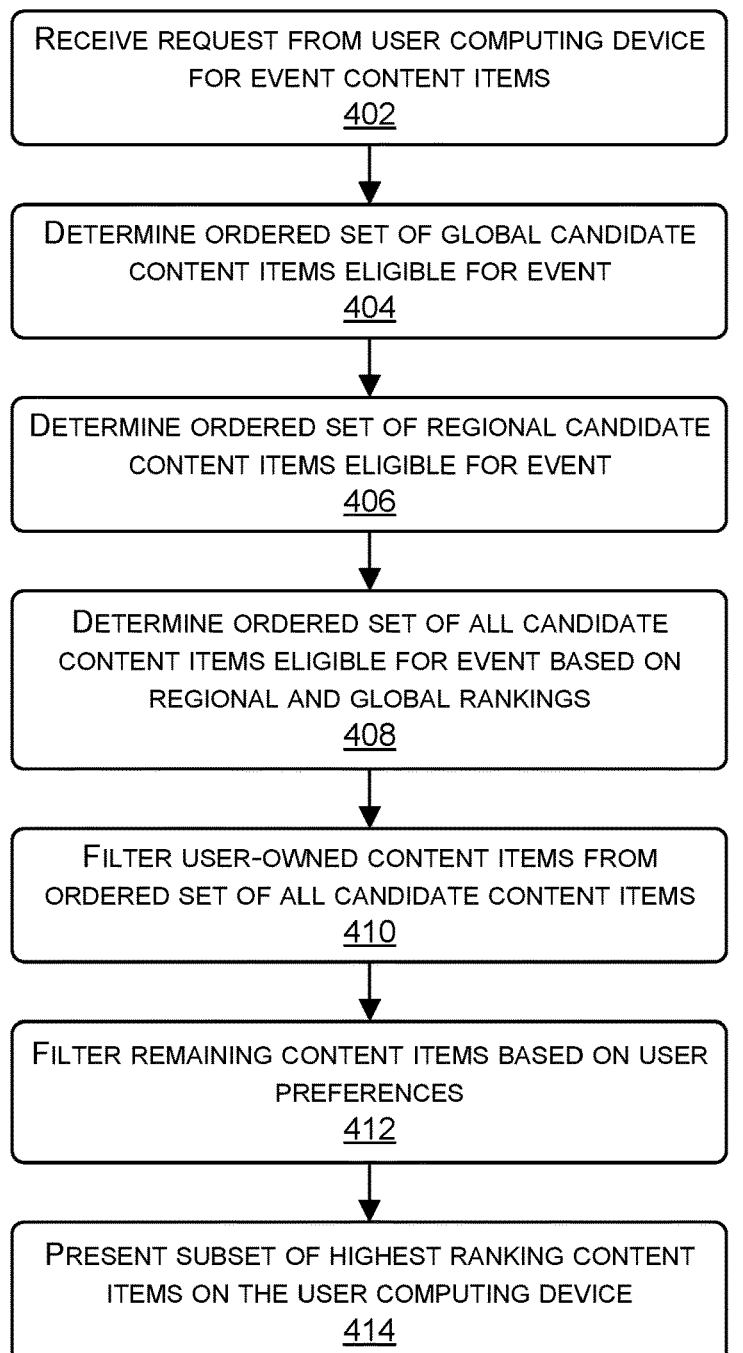

400

RECEIVE REQUEST FROM USER COMPUTING DEVICE
FOR EVENT CONTENT ITEMS
402

DETERMINE ORDERED SET OF GLOBAL CANDIDATE
CONTENT ITEMS ELIGIBLE FOR EVENT
404

DETERMINE ORDERED SET OF REGIONAL CANDIDATE
CONTENT ITEMS ELIGIBLE FOR EVENT
406

DETERMINE ORDERED SET OF ALL CANDIDATE
CONTENT ITEMS ELIGIBLE FOR EVENT BASED ON
REGIONAL AND GLOBAL RANKINGS
408

FILTER USER-OWNED CONTENT ITEMS FROM
ORDERED SET OF ALL CANDIDATE CONTENT ITEMS
410

FILTER REMAINING CONTENT ITEMS BASED ON USER
PREFERENCES
412

PRESENT SUBSET OF HIGHEST RANKING CONTENT
ITEMS ON THE USER COMPUTING DEVICE
414

FIG. 4

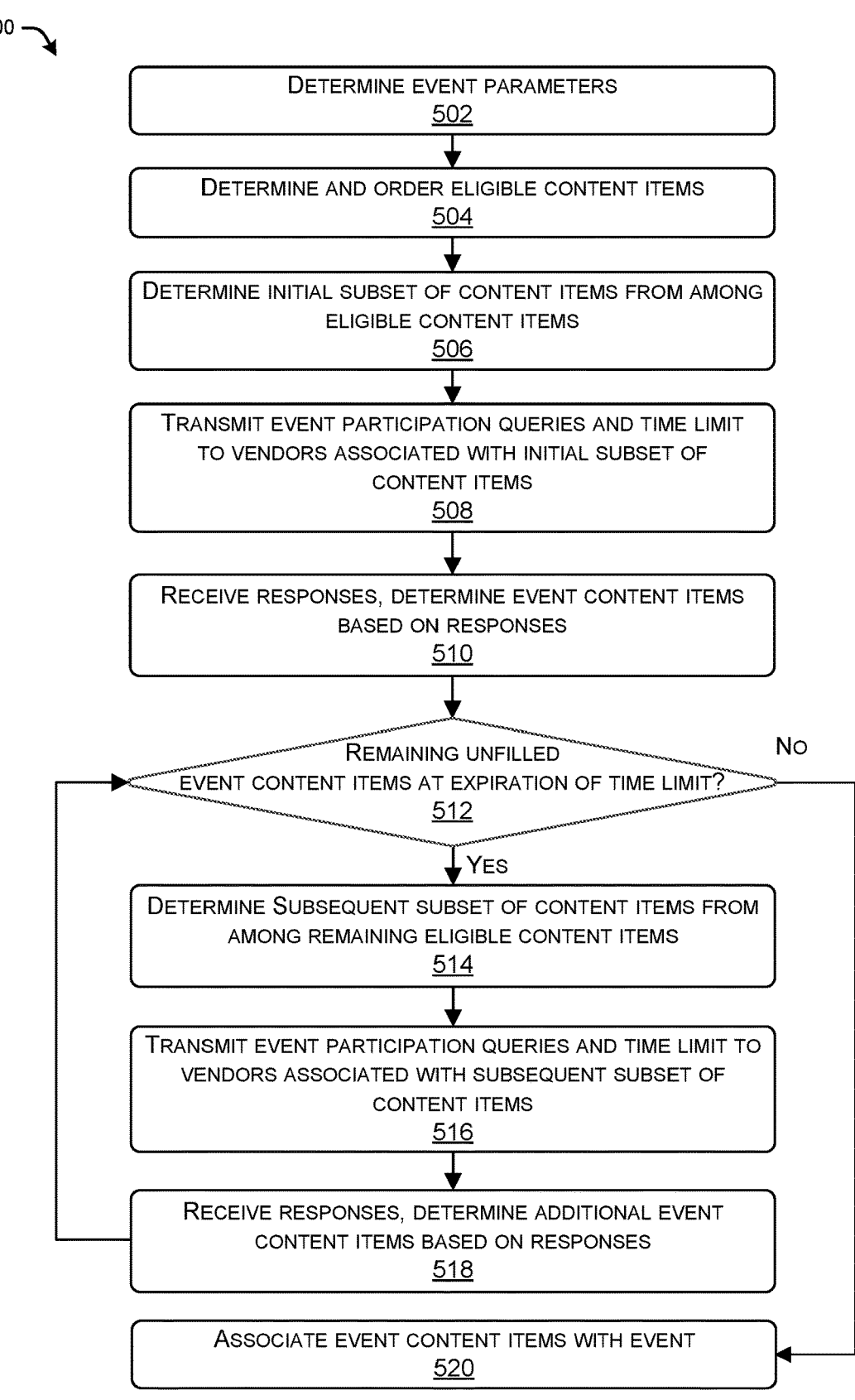

500

DETERMINE EVENT PARAMETERS
502

DETERMINE AND ORDER ELIGIBLE CONTENT ITEMS
504

DETERMINE INITIAL SUBSET OF CONTENT ITEMS FROM AMONG
ELIGIBLE CONTENT ITEMS
506

TRANSMIT EVENT PARTICIPATION QUERIES AND TIME LIMIT
TO VENDORS ASSOCIATED WITH INITIAL SUBSET OF
CONTENT ITEMS
508

RECEIVE RESPONSES, DETERMINE EVENT CONTENT ITEMS
BASED ON RESPONSES
510

REMAINING UNFILLED
EVENT CONTENT ITEMS AT EXPIRATION OF TIME LIMIT?
512

No

YES

DETERMINE SUBSEQUENT SUBSET OF CONTENT ITEMS FROM
AMONG REMAINING ELIGIBLE CONTENT ITEMS
514

TRANSMIT EVENT PARTICIPATION QUERIES AND TIME LIMIT TO
VENDORS ASSOCIATED WITH SUBSEQUENT SUBSET OF
CONTENT ITEMS
516

RECEIVE RESPONSES, DETERMINE ADDITIONAL EVENT
CONTENT ITEMS BASED ON RESPONSES
518

ASSOCIATE EVENT CONTENT ITEMS WITH EVENT
520

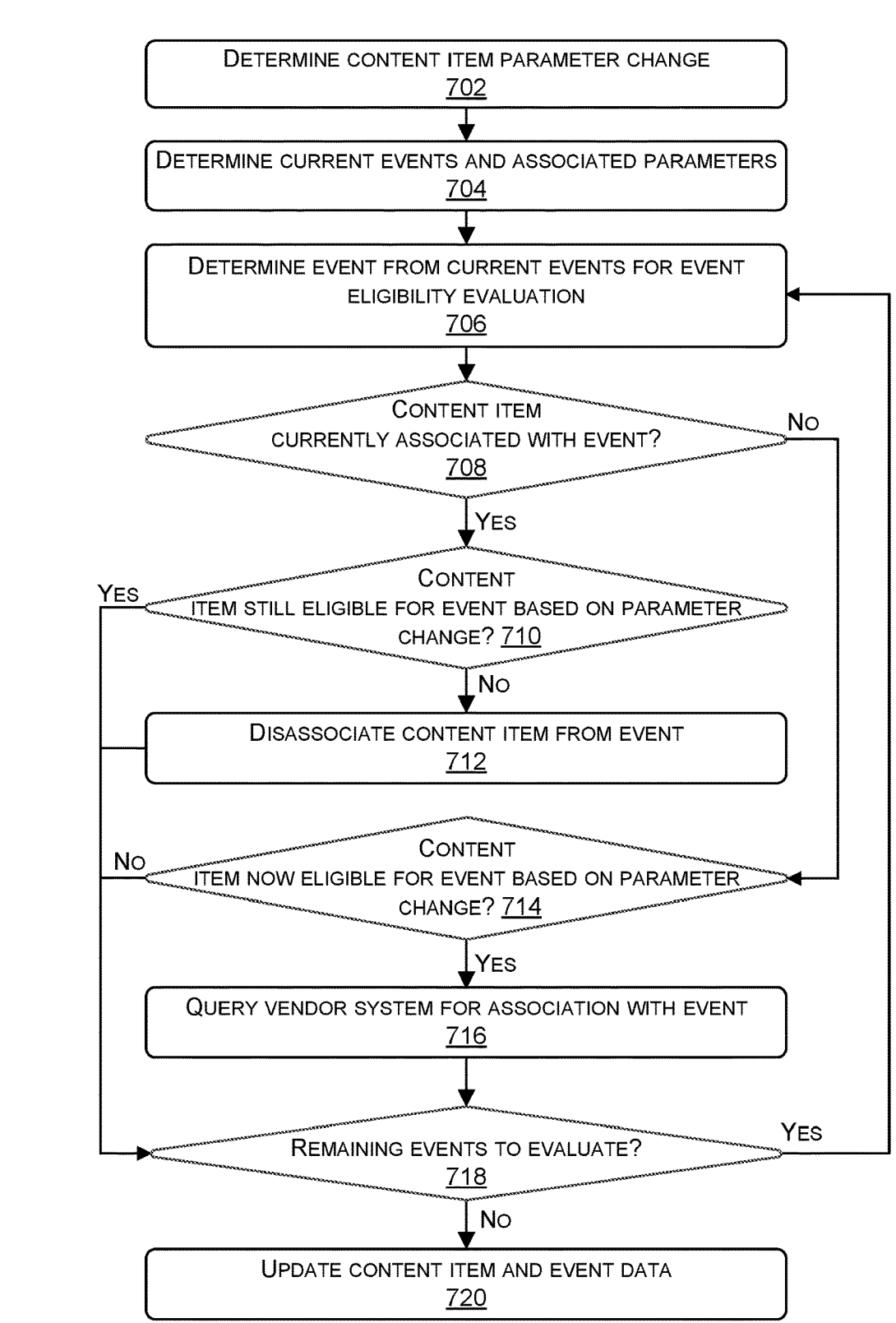

DETERMINE CONTENT ITEM PARAMETER CHANGE
702

DETERMINE CURRENT EVENTS AND ASSOCIATED PARAMETERS
704

DETERMINE EVENT FROM CURRENT EVENTS FOR EVENT ELIGIBILITY EVALUATION
706

CONTENT ITEM CURRENTLY ASSOCIATED WITH EVENT?
708

NO

YES

CONTENT ITEM STILL ELIGIBLE FOR EVENT BASED ON PARAMETER CHANGE? 710

YES

NO

DISASSOCIATE CONTENT ITEM FROM EVENT
712

CONTENT ITEM NOW ELIGIBLE FOR EVENT BASED ON PARAMETER CHANGE? 714

NO

YES

QUERY VENDOR SYSTEM FOR ASSOCIATION WITH EVENT
716

REMAINING EVENTS TO EVALUATE?
718

YES

NO

UPDATE CONTENT ITEM AND EVENT DATA
720

FIG. 7

SYSTEMS AND METHODS FOR DYNAMICALLY DETERMINING EVENT CONTENT ITEMS

BACKGROUND

As the consumption of content items on electronic devices has continued to proliferate, so has the number of available content items and information regarding these content items. For example, the number of songs, movies, television shows, and games available for streaming or download has increased substantially in the recent past. While this increase in available content items is generally beneficial to users, presenting content items and information of potential interest to individual users may be challenging due, in part, to the large number of available content items and limited screen area on which to present them.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 is a flow diagram of an example process for determining and presenting content items associated with an event on a client computing device in accordance with examples of the disclosure.

FIG. 5 is a flow diagram of an example process for determining content items associated with an event in accordance with examples of the disclosure.

FIG. 7 is a flow diagram of an example process for determining events for which content items may be eligible in accordance with examples of the disclosure.

DETAILED DESCRIPTION

Figure 1:
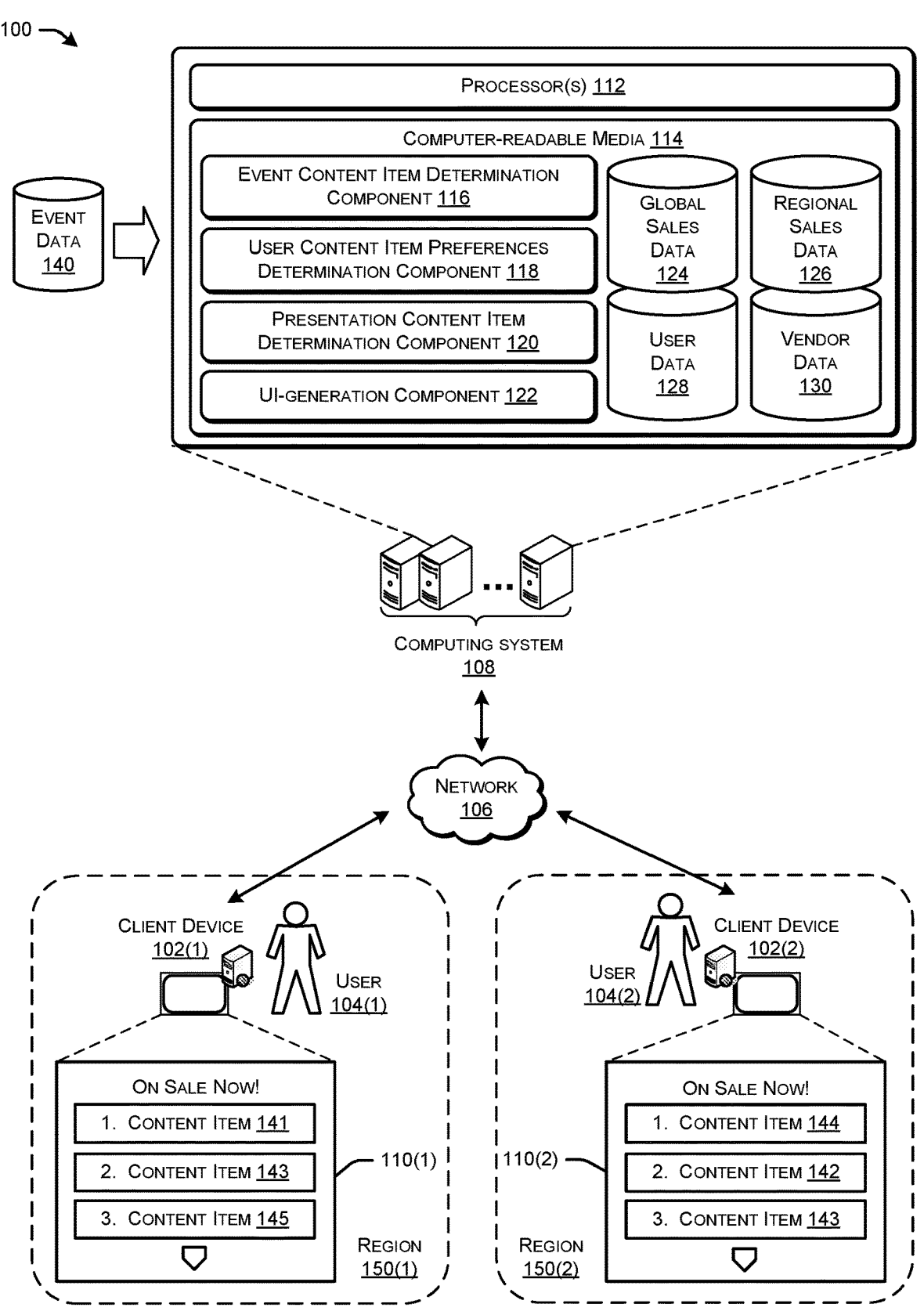
FIG. 1 is a diagram illustrating an example environment that includes a content distribution platform and multiple client computing devices configured to implement the techniques described herein.

Described herein are, among other things, techniques, devices, and systems for determining one or more content items that may be eligible for particular events and automatically generating a prioritized series of participation queries for vendors (e.g., content item and/or application creators, generators, and/or distributors) of such content items. Based on responses to a set of queries transmitted to an initial set of vendors, subsequent participation queries may be generated until a threshold quantity of participating content items have been identified. The set of content items determined to be associated with the event may be used to determine the particular content items presented on a user interface for the event. The content items presented to a particular user may be determined based on regional and/or global content item rankings, user preferences, and/or user purchases.

For example, an event may be a sale on video games or other computer applications that are associated with a particular theme (e.g., racing, action, fighting, etc.). The system may determine a set of games that qualify for inclusion in the themed sale and query vendors of such games for participation in the sale. The system may determine an order of solicitation based on various criteria. If there are remaining openings in the themed sale after an initial query is sent to a set of vendors, the system may determine a subsequent set of vendors (e.g., that may or may not overlap with the initial set) to query for participation in the sale. Such determinations and resulting queries may continue until the available slots in the sale have been filled and/or some other criteria have been met (e.g., a time period has expired, the event start time has arrived or will occur within a threshold period of time, there are no remaining eligible vendors that have not been solicited, etc.). The system may then use this set of games associated with the sale to determine and present a listing of sale games to individual users. The system may filter and/or sort the listings presented to users based on criteria associated with users and/or the games (e.g., user location, global ranking of game, regional ranking of game, user preferences, user purchase history, etc.).

In various examples, a listing presented to a user may be determined, filtered, and/or ranked based on user content consumption history data and/or user content consumption pattern data. For example, data based on a user's content item consumption history may be used to determine a set of content items that are associated with or similar to those items previously consumed by the user. For instance, content items with tags similar to those associated with items previously consumed by the user may be determined, filtered for, and/or ranked higher in a listing of content items. In some examples, low occurrence tags may be selected or used. For instance, sets of one or more less frequently occurring tags may be determined for a user (e.g., based on user history and/or other data) and used to determine content items with similar tag associations. Tags that are less frequently applied to content items may be more salient to user preferences that more frequently applied tags because they may more specifically reflect user interests. For example, an "action" tag may not be as useful in determining items to present to a user because there may be a great number of content items with that tag, while a more specific tag, such as "card-battler" or "battle royale," may be more useful because there may be fewer content items with such tags. In some examples, machine-learned models may be trained and used to detect and perform such associations.

The system may dynamically determine content items that may be eligible for inclusion in one or more events based on content item data. Because content item data may change over time, and because content items may be added to, or removed from, a content library at any time, an event eligibility evaluation may be performed in response to one or more changes in content data. For example, when an event is generated or otherwise configured, the system may initially determine a set of content items that are eligible for participation in the event based on one or more criteria (e.g., tags (e.g., user, vendor, etc.), tag quantity and/or weight, user ratings, user participation, sales rankings, wish list count, etc.). After the event has been initially configured, content items may be added to the library of available content items and/or data associated with content items currently in the library may be modified. The content item data associated with such items may be evaluated to determine whether items not currently associated with the event are eligible to be associated with the event and/or whether items currently associated with the event are no longer eligible to be associated with the event. Likewise, a recently removed content item that was participating in an event or included as an eligible content item for an event may be necessarily no longer able to participate in or eligible for such an event.

In various examples, a remote computing system that offers one or more content items, such as game titles, for acquisition may group such items into various categories. These categories may be associated with content genres (e.g., racing games, role-playing games, action games, strategy games, etc.), content types (e.g., single-player, multiplayer, etc.), content themes (e.g., anime, horror, space, open world, etc.), content availability (e.g., new release, demo, free, on sale, discounted, promotions, limited time availability, etc.), and/or any other criteria that may be associated with a content item. A particular content item may be associated with one or more content categories. In some examples, a category of "all" may include all available content items and one or more other categories may be a subset of the "all" category.

To encourage user interest in content items and acquisition of content items, a content provider operating such a remote system may conduct events that may be associated with one or more particular categories of content items. For example, a content provider may offer a sale on content items in a particular category. Such events may be referred to as a "themed" sale. Various techniques are described herein for determining the content items that may be eligible for participation in an event and for determining whether to associate such eligible items with the event. Further techniques are described herein for dynamically determining, based on updated content item data, whether content items have become eligible and/or ineligible for such an event and taking one or more responsive actions. Various additional techniques are described herein for determining, from a set of content items associated with an event, a subset of such items for presentation to a particular user and/or an order of presentation of such items.

In examples, a content provider may wish to promote more popular content items and therefore may present event content items to users in a descending order of one or more popularity criteria. For example, the content provider may rank items for presentation based on sales and/or use, listing the highest sales or user participation content item in the sale first, followed by the next highest, and so forth. Alternatively or additionally, a content provider may wish to promote less popular items and therefore may present event content items to users in an ascending order of one or more popularity criteria. For example, the content provider may rank items for presentation based on sales and/or use, listing the lowest sales or user participation content item in the sale first, followed by the next highest, and so forth. Alternatively or additionally, a content provider may wish to promote newer and/or older items and therefore may present event content items to users in a descending or ascending order of content item age criteria. For example, the content provider may rank the newest or newer items in the sale first, followed by the next newest, and so forth. The content provider may also, or instead, rank the oldest or older items in the sale first, followed by the next oldest, and so forth. The disclosed systems and techniques may enable a content provider system to be configured to perform operations to automatically determine content items eligible for an event, register such items for the event, and present the registered event content items to a user on a user interface in a manner customized for that user.

In examples, a content provider system may be configured with event data that includes various aspects and/or requirements of an event, such as an event start time, an event end time, an event theme, minimum sales requirements, minimum review requirements, minimum regional and/or global rankings, minimum or maximum user participation levels, a number of available content item positions ("slots"), etc. For example, the content provider may be a provider of video games and the event may be a themed sale on one or more particular video games. This themed sale may run for a limited period of time and may include games that are associated with one or more particular themes or other characteristics (e.g., racing games, role-playing games, action games, strategy games, etc.). While the example of a video game sale may be used as an example event herein, the disclosed systems and techniques are not limited to this example and may be implemented in any suitable system for any type of event.

Using event data, the content provider system may be configured to (e.g., automatically) determine a set of content items that are eligible to participate in the event. For example, the content provider system may determine one or more content items in its current catalog of content items that meet the requirements of the event. For example, the content provider may determine one or more content items having associated data with a data association to one or more of the requirements of the event (e.g., content item data satisfies the event requirement). The content provider system may rank such content items in an order that may be used to solicit vendors of the content items for participation in the event. The content provider system may select a subset of the ranked content items (e.g., a particular number (e.g., 5, 10, 25, 50, etc.) of highest ranked content items) and transmit a participation query to the vendors associated with the content items soliciting their participation in the event. This query may include the timeframe of the event (or a request for a vendor's preferred timeframe), a discount and/or minimum discount to be applied to sales of their respective content item during the event (or a request for a vendor's preferred discount), and/or a means of responding and/or registering the respective content items for the event. Other information may also, or instead, be included in participation queries, such as a deadline to respond, a remaining number of slots in the event (e.g., for a particular timeframe), criteria used to determine a presentation manner of event content items (e.g., presentation order on a user interface), etc.

At the end of a period of time following the transmission of the initial set of participation queries (and/or in response to one or more other conditions or criteria), the content provider system may determine the particular content items that vendors have registered to participate in an event. If there are remaining slots in the event, the content provider system may determine a subsequent subset of the ranked content items (e.g., a particular number (e.g., 5, 10, 25, 50, etc.) of next highest ranked content items) and transmit a participation query to the vendors associated with those content items soliciting their participation in the event. The solicitation may also be associated with a limited time period (and/or one or more other conditions or criteria) that may be similar to that associated with the initial set of participation queries. At the end of that time period (and/or in response to one or more other conditions or criteria), the content provider system may again determine whether there are remaining available slots in the event. If so, the content provider system may determine a next subsequent subset of the ranked content items and transmit queries to those corresponding vendors, and so forth, until the event slots have been filled, an event participation deadline has been reached, and/or one or more other conditions or criteria have been met.

The ranking of content items that are eligible for participation in an event, and thus the order in which associated vendors may be solicited for participation in the event, may be based on one or more ranking criteria. In examples, the content items may be ranked based on global sales ranking and/or quantities of user interaction with the content item. Alternatively or additionally, the content items may be ranked based on vendor preference (e.g., preferred vendors may be ranked higher than other vendors). Vendor preference may be determined based on contractual agreements with the content providers and/or other criteria or arrangements that may configure a vendor as a preferred vendor. Alternatively or additionally, the content items may be ranked based on a quantity of user "wish list" placements and/or one or more other indicators of user interest in the content items. Any one or more of such criteria, and/or any other criteria, may be used individually or in any combination to determine a ranking of eligible content items.

In examples, an event may have various types of temporal parameters that may be indicated to vendors and/or selected by vendors for their content items. For example, an event may be a one-time sale that occurs in one time period and may include up to 10 content items. Alternatively or additionally, an event may include several periods of time over a timeframe. For example, an event may be a sale that occurs daily for two weeks and may include 25 items per day. In such an example, a vendor may select one or more days in the two-week period for its content item's participation in the event.

An event may also, or instead, have regional parameters. For example, vendors of content items that are highly ranked (e.g., based on sales, reviews, wish lists, etc.) in a particular region, but not other regions, may be solicited for participating in the event, but only for that region. Alternatively or additionally, vendors of content items that are highly ranked globally may be solicited for participating globally in the event.

A number of content items or slots associated with a particular event may be a same number of items to be presented to a user during the event or a different number to account for user attribute-based presentation of event content items. For example, as described in more detail herein, the content items associated with an event and presented to a user may be ordered and presented based on user preferences, user content consumption history data, user content consumption pattern data, and/or other user attributes. When a particular content item is determined to not be presented to a user (e.g., because the user already owns the item, has a preference against the item or similar items, etc.), the content provider system may present another content item to the user in its place. Therefore, the content provider system may determine a quantity of content items for an event that exceeds the number of content items to be (e.g., initially) presented to a user to allow for replacing one or more such content items in the content item presentation. The content provider system may further order the items associated with the event for presentation placement based on various criteria, such as responsiveness to the participation query (e.g., earlier registrations for the event get assigned higher placement), sales criteria (e.g., higher sales get higher placement), reviews (e.g., better reviews get higher placement), etc.

A non-limiting video game example will now be described for determining content items associated with an event. A content provider system may be configured with event data that indicates a video game sale on racing games that will last one week and have 10 games presented to users per day. The event may have 15 slots available per day for the duration of the event (e.g., to allow for presentation of replacement games), for a total of 105 slots. The event may be limited to games that are ranked in the top 100 for sales globally and/or the top 50 in sales for any region. Preferred vendors may take priority. The discount on the games for the sale may be set by the vendor but must be at least 10% of the normal price. The event recruitment period may end one week before the sale begins (e.g., the final deadline for registering for the sale may occur one week before the sale begins).

The content provider system, in response to receiving this event configuration data, may determine the content items that are eligible by determining the available content items that are racing games. The content provider system may then determine the racing games that are also ranked in the top 100 for sales globally and/or the top 50 in sales for any region. The content provider system may then order these eligible racing games based on vendor, ranking the games from preferred vendors above those from non-preferred vendors to generate a set of eligible racing games.

The content provider system may then determine an initial subset of the eligible content items, for example, the top 50 games in the set of eligible racing games. The content provider system may generate and transmit a participation query to the vendors for the individual games in the initial subset of eligible racing games. This query may indicate the parameters of the sale and request that interested vendors register for the sale and indicate their preferred slot(s) and discount before the expiration of an initial registration deadline. Vendor registration for an event and indication of preferences (e.g., preferred discount) may take the form of registering at a registration site (e.g., linked in the participation query), responding to the participation query, accepting a request to create a data association between the content item and the event, initiating (e.g., by the vendor system and/or the content provider system) a data association between the content item and the event, or any other means.

At the initial registration deadline, the content provider may determine whether there are remaining available slots for the sale. For example, the content provider system may determine that 47 of the 105 total available slots have been filled by registered content items. The content provider system may then determine a subsequent subset of the eligible content items, for example, the next 50 games ranked below the top 50 games in the set of eligible racing games. The content provider system may generate and transmit a participation query to the vendors for the individual games in the subsequent subset of eligible racing games. This query may indicate the parameters of the sale and request that interested vendors register for the sale and indicate their preferred slot(s) and discount before the expiration of a subsequent registration deadline.

At the subsequent registration deadline, the content provider may determine whether there are remaining available slots for the sale. For example, the content provider system may determine that 93 of the 105 total available slots have now been filled by registered content items. The content provider system may then determine another subsequent subset of the eligible content items, for example, the next 50 games ranked below the top 100 games in the set of eligible racing games, send participation queries to those vendors, and so forth until the slots have all been filled or until the deadline for registering for the sale arrives. The final set of games to be included in the sale may be ranked based on one or more criteria, including those described herein, and associated with the sale. The sale games may then be presented to users, for example, as described herein, during the sale period and/or based on the sale data.

As will be appreciated, a content provider may maintain a large and constantly fluctuating catalog of content items. The attributes of such items may also change, sometimes frequently. For example, users may add reviews to the items or edit item reviews, total sales may increase over time, periodic sales (e.g., sales per month, quarter, etc.) may fluctuate over time, tags (e.g., indicating themes, characteristics, attributes, etc.) associated with items may be added and/or removed, etc. These changes in content items and a content item catalog may affect the eligibility of such items for particular events, such as themed sales on content items. This may prevent recently eligible content items from being included in an event or may facilitate participation of ineligible content items in an event. For example, an event recruitment period may have started before a particular content item reached the requirements for participating in the event but may still be ongoing when the particular content item becomes eligible for the event. Likewise, a particular content item that was eligible for an event at the outset of an event recruitment period may become ineligible for the event while the event recruitment period is still ongoing.

In examples, a content provider system may evaluate content items dynamically for eligibility for participation in events based on detected changes to the content items and/or associated data. The content provider system may (e.g., substantially continuously or periodically) monitor potentially event-relevant data associated with content items in its catalog, such as total sales (global and/or regional), periodic sales, wish list inclusions, tags (e.g., upon which a content item them may be based), reviews, etc. The content provider system, in response to detecting a change in one or more pieces of potentially event-relevant data associated with a content item, may evaluate the content item and/or its associated data to determine if the content item is now eligible for a currently recruiting event (e.g., an event for which a recruitment period is ongoing) or no longer eligible for a currently recruiting or in-progress event. The content provider system may also detect newly added content items and, upon detecting the addition of such items, determine if the content item is eligible for a currently recruiting event. The content provider system may also, or instead, detect removed content items and, upon detecting the removal of such items, determine that the content item is no longer eligible for a currently recruiting event.

If there has been no change in the eligibility of a modified or newly added content item, the content provider system may take no further actions for that content item in regard to currently recruiting and/or ongoing events.

If the content item is now eligible for one or more events, the content provider system may determine a position of the content item in a set of eligible content items for the event(s) for which is it now eligible. The content provider system may then query the content item vendor, for example as described herein, for participation in the event.

If the content item is no longer eligible for an event for which it is currently included in a set of eligible content items, the content provider system may remove the content item from that set of items. If the content item is in a list of items currently being offered as part of an event, the content provider system may remove the content item from that list, in some examples soliciting one or more vendors for replacement event items and/or using surplus items (e.g., in excess of those required for presentation to a user) associated with the event. Similar operations may be performed for items that have been removed from a catalog and are necessarily no longer able or eligible to participate in events.

Referring again to a video game example, the content items maintained by a content provider system may have associated tags that may be added to a video game by the vendor of the game (e.g., when submitting the game to the content provider) and/or by users (e.g., based on their use of the game). A particular game may include racing, fighting, and puzzle aspects. The vendor, for marketing reasons, may have initially configured the game with a racing tag and therefore the game may have been determined eligible for racing-themed sales. However, over time users may have added fighting and puzzle tags to the game. The content provider system may detect these tags (e.g., a threshold number of such tags) and, in response, determine that the game is now eligible for fighting and puzzle-themed sales.

In another video game example, a particular game may have above 10,000 purchases per month when a recruitment period for a particular sale requiring a minimum of 10,000 purchases per month for participating content items begins. Therefore (e.g., based on all other eligibility requirements being met), the game may be added to the set of eligible games for that sale. However, over the course of the next few weeks, the monthly sales for that particular game may drop below 10,000 purchases per month while the sale recruitment period is still ongoing. The content provider system may, in response to detecting this drop in sales, remove the game from the set of eligible games for that sale.

In the video game example, newly added games may be similarly evaluated for participation in ongoing events for which a recruitment period is active, while recently removed games may be removed from sets of eligible games and/or ongoing sales.

A content provider may use a set of content items associated with an event, for example determined as described herein, to determine a manner of presentation of a subset of such event content items. For example, once an event commences, the content provider system may determine a subset of content items to present to a user on a user interface and/or a manner of presenting such content items. This determination may be made based on various factors that may include, but are not limited to, user preferences, a user purchase history, user wish list selections, and/or a user region.

For example, a content provider system may receive a request to generate or otherwise cause a user interface with event presentation data to be presented to a particular user on a display of a user computing system. This event presentation data may include indications of one or more content items associated with the event. In examples, the content provider system may determine whether any of the content items that are associated with the event have already been purchased or are otherwise owned by the user. If so, those content items may be removed from consideration for presentation to the user.

The content provider system may also, or instead, remove from consideration for presentation one or more content items that conflict with one or more user preferences. For example, a user may configure (e.g., in user preferences) a particular tag as a "blocked" tag, which may indicate that the user does not want to be offered content associated with that tag. The content provider system may remove from consideration for presentation any items that are associated with that tag. In examples, a user may also, or instead, configure (e.g., in user preferences) one or more particular vendors and/or content item franchises or other groupings of content items as "blocked" or otherwise indicate that the user does not want to be offered content associated with such vendors and/or content item franchises or groupings. The content provider system may detect such indications and remove from consideration for presentation any items that are associated with the blocked vendors and/or content item franchises or groupings vendors and/or content item franchises or groupings. The content provider system may also, or instead, remove from consideration for presentation one or more content items that do not meet one or more minimum requirements, such as a minimum total regional and/or global sales threshold, a minimum periodic regional and/or global sales threshold, a minimum aggregate review score, etc.

The content provider system may also, or instead, account for user preferences for particular content in determining for presentation one or more content items. Such user preferences may indicate that a user is particularly interested in the associated content. For example, a user may configure (e.g., in user preferences) a particular tag as a "preferred" tag, which may indicate that the user wants to be offered content associated with that tag. The content provider system may rank higher or elevate for consideration for presentation any items that are associated with that tag. In examples, a user may also, or instead, configure (e.g., in user preferences) one or more particular vendors and/or content item franchises or other groupings of content items as "preferred" or otherwise indicate that the user wants to be offered content associated with such vendors and/or content item franchises or groupings. The content provider system may detect such indications and rank higher or elevate for consideration for presentation any items that are associated with the user-preferred vendors and/or content item franchises or groupings vendors and/or content item franchises or groupings.

The content provider system may further determine a manner of presentation of one or more content items in consideration for presentation on a user interface. A manner of presentation may include an order of display and/or a ranking of items in consideration for presentation. For example, the content provider system may determine a region associated with the user and may determine the regional sales ranking for that region of content items associated with the event. The content provider system may then order the items for presentation consideration based on the regional sales ranking. Similarly, the content provider system may use global sales rankings, review scores, wish list count, tag count (e.g., a quantity of a particular tag applied by users), user content consumption history data, user content consumption pattern data, user preferences (e.g., indications of blocked and/or preferred content), and/ or any other attributes that may be associated with a content item to determine a manner of presentation of such items to a user as part of event presentation data.

Returning again to the video game example, the content provider system may initiate a racing game sale after determining the eligible games and obtaining game registrations for vendors (e.g., as described herein). A user in a particular region may operate a user computing system to navigate to an interface on which the content provider is configured to present sale information (e.g., a home page generated by the content provider for the user, a sale page, etc.). The content provider system may determine a set of sale racing games for consideration for presentation on the interface. The content provider system may then filter out those sale racing games that the user already owns and/or that do not meet a minimum total regional sales threshold. The content provider system may then order the remaining sale racing games based on the most recent periodic (e.g., monthly) regional sales ranking and present a subset of these games (e.g., the top 3, top 5, top 10, etc.) on the user interface.

The techniques introduced above are described with reference to FIGS. 1-8. The disclosed techniques may be implemented, at least in part, by a remote computing system that distributes content items (e.g., video games, movies, television shows, songs, game titles, etc.) to client devices of a user community (e.g., as part of a video-game service, movie service, song service, etc.). It is to be appreciated that while these techniques are described with reference to games (e.g., video games), these techniques may apply to any other type of content items, such as books, movies, videos, songs, or the like.

FIG. 1 is a diagram illustrating an example environment 100 that includes a first client computing device (or "client device") 102(1) operated by a first user 104(1) as well as a second client computing device 102(2) operated by a second user 104(2). As illustrated, the client computing devices 102(1) and 102(2) may communicate with one or more other computing devices over a network 106. For example, the client computing devices 102(1) and 102(2) may communicate via the network 106 with a remote computing system 108 that is configured to provide games and/or other content items to the client computing devices (collectively, "devices 102"). The remote computing system 108 may be a content provider system as described herein or any other device, system, or combination of devices and/or systems that may be suitable for implementing the disclosed techniques.

The client devices 102 may be implemented as any suitable type of computing device configured to execute content items, such as video games, movies, songs, and/or the like. The client devices 102 may comprise, without limitation, a personal computer (PC), a desktop computer, a laptop computer, a mobile phone (e.g., a smartphone), a tablet computer, a portable digital assistant (PDA), a wearable computer (e.g., virtual reality (VR) headset, augmented reality (AR) headset, smart glasses, etc.), an in-vehicle (e.g., in-car) computer, a television (smart television), a set-top-box (STB), a game console, a music player, a voice-controlled assistant, and/or any similar computing device. In some instances, the client devices 102 may include integral displays, while in other instances the client devices may couple to respective display devices. In addition, the client devices 102 may communicate with the remote computing system ("computing system") 108 over the computer network 106. The computer network 106 may represent and/or include, without limitation, the Internet, other types of data and/or voice networks, a wired infrastructure (e.g., coaxial cable, fiber optic cable, etc.), a wireless infrastructure (e.g., radio frequencies (RF), cellular, satellite, etc.), any other connection technologies, and/or any combination thereof. The computing system 108 may, in some instances, be part of a network-accessible computing platform that is maintained and accessible via the computer network 106. Network-accessible computing platforms such as this may be referred to using terms such as "on-demand computing,"

"software as a service (SaaS)," "platform computing," "network-accessible platform," "cloud services," "data centers," and so forth.

In some embodiments, the computing system 108 acts as, or has access to, a video game platform that implements a video game service to distribute (e.g., download, stream, etc.) video games (or any other type of content item) to client devices, such as the client device 102. In an example, each client device may install a client application thereon. The installed client application may be a video game client (e.g., gaming software to play video games) and/or a web browser. A client device 102 with an installed client application may be configured to download, stream, or otherwise receive programs (e.g., video games, and content thereof) from the computing system 108 over the computer network 106. Any type of content-distribution model may be utilized for this purpose, such as a direct purchase model where programs (e.g., video games) are individually purchasable for download and execution on a client device 102, a subscription-based model, a content-distribution model where programs are rented or leased for a period of time and streamed to the client devices, or any other model where content is otherwise made available to the client devices. Accordingly, an individual client device 102 may include one or more installed video games that are executable by loading the client application.

The client device 102 may be used to register with, and thereafter login to, a video game service. A user may create a user account for this purpose and specify/set credentials (e.g., passwords, PINs, biometric IDs, etc.) tied to the registered user account. A user may also, or instead, create a user profile for this purpose that has additional and/or supplemental information (e.g., user information and/or user preferences). As a plurality of users may interact with the video game platform (e.g., by accessing their user/player profiles with a registered user account, playing video games on their respective client devices, etc.), the client devices send data to the remote computing system 108. The data sent to the remote computing system 108, for a given client device 102, may include, without limitation, user input data, video game data (e.g., game performance statistics uploaded to the remote system), social networking messages and related activity, identifiers (IDs) of the video games played on the client device 102, a region 150 in which the user 104 and/or the client device 102 is located, wish list requests, tags for programs (e.g., video games), reviews and/or ratings for programs (e.g., video games), program (e.g., video game) browsing and/or exploring history and related data, browser data and activity, and so on. This data can be streamed in real-time (or substantially real-time), sent to the remote system 108 at defined intervals, and/or uploaded in response to events (e.g., exiting a video game, selecting a control on a user interface, etc.). This data may be used to determine a gameplay history of the user 104 of the client device 102, preferences of the user 104, or the like, which may be used to determine which game titles (e.g., content items, incentive items, bonus items, sale items, icons representing such items, etc.) to present to the user and/or a manner (e.g., an order) in which to present the game titles to the user (e.g., in a series of one or more user interfaces), as introduced above and discussed in further detail below.

For instance, the user 104(1) may operate the client device 102(1) to navigate to a webpage or the like associated with the computing system 108 and, in response, the computing system 108 may cause the client device 102(1) to present a user interface (UI) 110(1) on a display of the client device 102(1). In some instances, this UI 110(1) may include information regarding one or more video games and/or other content items available for acquisition by the user 104(1) and from the computing system 108. For instance, the UI 110(1) may include icons associated with the respective game titles, with these icons being selectable by the user 104(1) to learn more information regarding a respective game title, request to acquire the respective game title, and so forth. In some instances, and as illustrated, the UI 110(1) may include a set of icons indicating a subset of content items that may be associated with a sale (e.g., a themed sale). As shown in this figure, content items 141, 143, and 145 may be presented to the user 104(1) on the UI 110(1). These icons may represent a subset of the content items associated with a particular event determined for presentation by the computing system 108.

In some instances, the computing system 108 may determine the subset of sale content items that includes items 141, 143, and 145 based on data associated with the user 104(1) and/or the client device 102(1). For example, the sale content items 141, 143, and 145 may be included in a set of sale content items that also includes items 142 and 144. An initial set of sale content items associated with the sale represented in the UI 110(1) may include items 141-145 in that order. The computing system 108 may determine (e.g., based on the user account and/or order history) that user 104(1) already owns item 142. In response, the computing system 108 may remove the item 142 from consideration for presentation to the user 104(1) in the UI 110(1). The computing system 108 may further determine (e.g., based on the user preferences, user content consumption history data, user content consumption pattern data, etc.) that user 104(1) has configured a preference indicating that the user 104(1) prefers not to be shown items associated with a particular tag, a particular vendor, a particular franchise or grouping, etc. that may have been associated with item 144. In response, the computing system 108 may remove the item 144 from consideration for presentation to the user 104(1) in the UI 110(1). The computing system 108 may also, or instead, determine (e.g., based on the user preferences, user content consumption history data, user content consumption pattern data, etc.) that user 104(1) has configured a preference indicating that the user 104(1) prefers to be shown items associated with a particular tag, a particular vendor, a particular franchise or grouping, etc. that may have been associated with item 144. In response, the computing system 108 may select the item 144 for presentation to the user 104(1) in the UI 110(1) or otherwise elevate the item 144 for consideration for presentation to the user 104(1) in the UI 110(1).

The computing system 108 may further determine the order of presentation of the items 141, 143, and 145 based on data associated with the user 104(1) and/or the client device 102(1). For example, the computing system 108 may determine (e.g., from communication with client device 102(1), from user account information, from user payment information, from user content consumption history data, from user content consumption pattern data, from user preferences, etc.) that the user 104(1) and/or the client device 102(1) is in region 150(1). Using this information, the computing system 108 may order the items 141, 143, and 145 for presentation as shown in this figure based on the sales ranking of these items in the region 150(1), the average review score or rating of these items in the region 150(1), the number of wish lists in the region 150(1) on which these items appear, etc.

Alternatively or additionally, the order of presentation of the items 141, 143, and 145 may be based on other criteria.

For example, the order may be based on preferred vendor status, a discount amount (e.g., higher placement for items with greater discounts, for example, based on a percentage discount from normal price or total amount discounted), global rating and/or sales, global number of wish list inclusions, number of tags (e.g., number of times a particular tag has been applied by users to the item), etc.

In another example, the user 104(2) may operate the client device 102(2) to navigate to a webpage or the like associated with the computing system 108 and, in response, the computing system 108 may cause the client device 102(2) to present a UI 110(2) on a display of the client device 102(2). Like the UI 110(1), the UI 110(2) may include information regarding one or more video games and/or other content items available for acquisition by the user 104(2) and from the computing system 108. For instance, the UI 110(2) may include icons associated with the respective game titles, with these icons being selectable by the user 104(2) to learn more information regarding a respective game title, request to acquire the respective game title, and so forth. In some instances, and as illustrated, the UI 110(2) may include a set of icons indicating a subset of content items that may be associated with a sale (e.g., a themed sale). As shown in this figure, content items 144, 142, and 143 may be presented to the user 104(2) on the UI 110(2). These icons may represent a subset of the content items associated with a particular event determined for presentation by the computing system 108.

The computing system 108 may determine the subset of sale content items that includes items 144, 142, and 143 based on data associated with the user 104(2) and/or the client device 102(2). For example, the sale content items 144, 142, and 143 may be included in the initial set of sale content items described above that includes items 141-145 in that order. The computing system 108 may determine (e.g., based on the user account and/or order history) that user 104(2) already owns item 141. In response, the computing system 108 may remove the item 141 from consideration for presentation to the user 104(2) in the UI 110(2). The computing system 108 may further determine (e.g., based on the user preferences, user content consumption history data, user content consumption pattern data, etc.) that user 104(2) has configured a preference indicating that the user 104(2) prefers and/or prefers not to be shown items associated with a particular tag, vendor, grouping, franchise, etc. that may have been associated with item 145. In response, the computing system 108 may add, elevate, and/or remove the item 145 from consideration for presentation to the user 104(2) in the UI 110(2).

The computing system 108 may further determine the order of presentation of the items 144, 142, and 143 based on data associated with the user 104(2) and/or the client device 102(2). For example, the computing system 108 may determine (e.g., from communication with client device 102(2), from user account information, from user payment information, from user content consumption history data, user content consumption pattern data, etc.) that the user 104(2) and/or the client device 102(2) is in region 150(2). Using this information, the computing system 108 may order the items 144, 142, and 143 for presentation as shown in this figure based on the sales ranking of these items in the region 150(2), the average review score or rating of these items in the region 150(2), the number of wish lists in the region 150(2) on which these items appear, etc. As can be seen for this figure, the ordering in one region may vary from the ordering in another region.

Alternatively or additionally, the order of presentation of the items 144, 142, and 143 may be based on other criteria. As with the items of UI 110(1), the order of presentation of the items 144, 142, and 143 may be based on preferred vendor status, a discount amount (e.g., higher placement for items with greater discounts, for example, based on a percentage discount from normal price or total amount discounted), global rating and/or sale, global number of wish list inclusions, number of tags (e.g., number of times a particular tag has been applied by users to the item), etc.

FIG. 1 further illustrates example components of the computing system 108 for generating the respective UIs 110(1) and 110(2). As illustrated, the computing system 108 may comprise one or more processors 112 (e.g., one or more central processing units (CPU(s)) and computer-readable media 114, as well as components stored thereon for generating UIs, such as example UIs 110(1) and 110(2). The computer-readable media 114 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information, and which can be accessed by a computing device. The computer-readable media 114 may be implemented as computer-readable storage media ("CRSM"), which may be any available physical media accessible by the processor(s) 112 to execute instructions stored on the computer-readable media 114. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information, which can be accessed by the processor(s) 112.

As illustrated, the computer-readable media 114 may store or otherwise have access to an event content item determination component 116, a user content item preferences determination component 118, a presentation content item determination component 120, and/or a UI-generation component 122. In addition, the media 114 may store global sales data 124 storing global total and/or periodic sales data for content items, regional sales data 126 storing regional total and/or periodic sales data for content items, user data 128 that may include user account data, user preferences, and/or other data associated with users as described herein, and/or vendor data 130 that may include preferred vendor data, vendor-specified discount data, vendor content item data, and/or any other vendor-related data as described herein. User data 128 may also include user content consumption history data, user content consumption pattern data, user preferences (e.g., indications of blocked and/or preferred content, tags, vendors, franchises, groupings, etc.).

The computing system 108 may receive event data 140 that it may use to generate UIs that may include event data and representations of event content items, such as example UIs 110(1) and 110(2). The event data 140 may indicate event parameters, event content items, and/or any other data that may be used by the computing system 108 to determine content items associated with an event to be presented to a user and a manner of presentation of such items. The vent data 140 may be one or more data structures (e.g., an event data structure) that may store or otherwise be configured with event data of any type and/or quantity, including as described herein. An event data structure may include or represent one or more data associations of content items and/or content item data and an event and/or event data (e.g., may include or indicate data associations indicating content items eligible for and/or participating in an event).

The event content item determination component 116 may function to determine the content items associated with an event that may be considered for presentation to a user. For example, the event content item determination component 116 may determine, based on the event data 140, one or more content items that have been registered for a particular event, that may also be indicated in the event data 140. In examples, the event data 140 may include identifiers of such content that the event content item determination component 116 may use to retrieve or otherwise determine content item data that it may associate with the event. Alternatively, the event content item determination component 116 may determine event content item data from the event data 140. The event content item determination component 116 may further rank or order a set of event content items once determined, using any of the ordering or ranking techniques described herein.

The user content item preferences determination component 118 may function to determine any user data or related data that may be used to determine the presentation of content items and/or the generation of one or more UIs, such as example UIs 110(1) and 110(2). For example, the user content item preferences determination component 118 may determine or acquire user preferences regarding content (e.g., preferred and/or blocked tags, content, vendors, franchises, and/or groupings; user content consumption history data and/or user content consumption pattern data; etc.), user region data, user account information, etc. In some examples, the user content item preferences determination component 118 may retrieve this data from user data 128. This information may be used by one or more other components, such as the presentation content item determination component 120, to determine presentation content items and/or a manner of presentation of such items.

The presentation content item determination component 120 may determine one or more content items for presentation to a user on a UI, such as example UIs 110(1) and 110(2), and manner of presentation of such items. The presentation content item determination component 120 may base this determination on user data 128, global sales data 124, regional sales data 126, vendor data 130, event data 140, and/or data received from other components, such as user content item preferences determination component 118. For example, the presentation content item determination component 120 may determine, from the content items associated with the event (e.g., as determined by event content item determination component 116) those items that a particular user does not already own (e.g., based on user data 128 and/or data received from the user content item preferences component 118). The presentation content item determination component 120 may then order those items based on various criteria (e.g., based on global sales data 124, regional sales data 126, vendor data 130, etc.) to generate a set of presentation content items that may be used for a particular UI associated with the particular user. The presentation content item determination component 120 may also, or instead, order those items based on various user-related criteria, such as preferred and/or blocked tags, content, vendors, franchises, and/or groupings; user content consumption history data; user content consumption pattern data; etc. The presentation content item determination component 120 may then determine a particular subset of content items from the ordered set of presentation content items to be presented in a UI to the user. The presentation content item determination component 120 may provide this subset of content items and/or data associated therewith to the UI-generation component 122.

The UI-generation component 122 may generate a UI for presentation on a client device. For example, the UI generation component 122 may receive a subset of content items from an ordered set of presentation content items from the presentation content item determination component 120 and may use this set of content items to generate a UI presenting at least the subset of content items and event-related information. The UI-generation component 122 may then provide the UI for presentation on the client device.

Note that in some examples, various functions and/or components may be distributed across multiple devices, including client devices. For example, one or more of the event content item determination component 116, the user content item preferences determination component 118, the presentation content item determination component 120, and/or the UI-generation component 122 may be configured on one or both of the client devices 102. Either or both of the client devices 102 may be configured to perform any one or more of the functions described herein (e.g., using the data as described herein) in regard to those and similar components.

Figure 2:
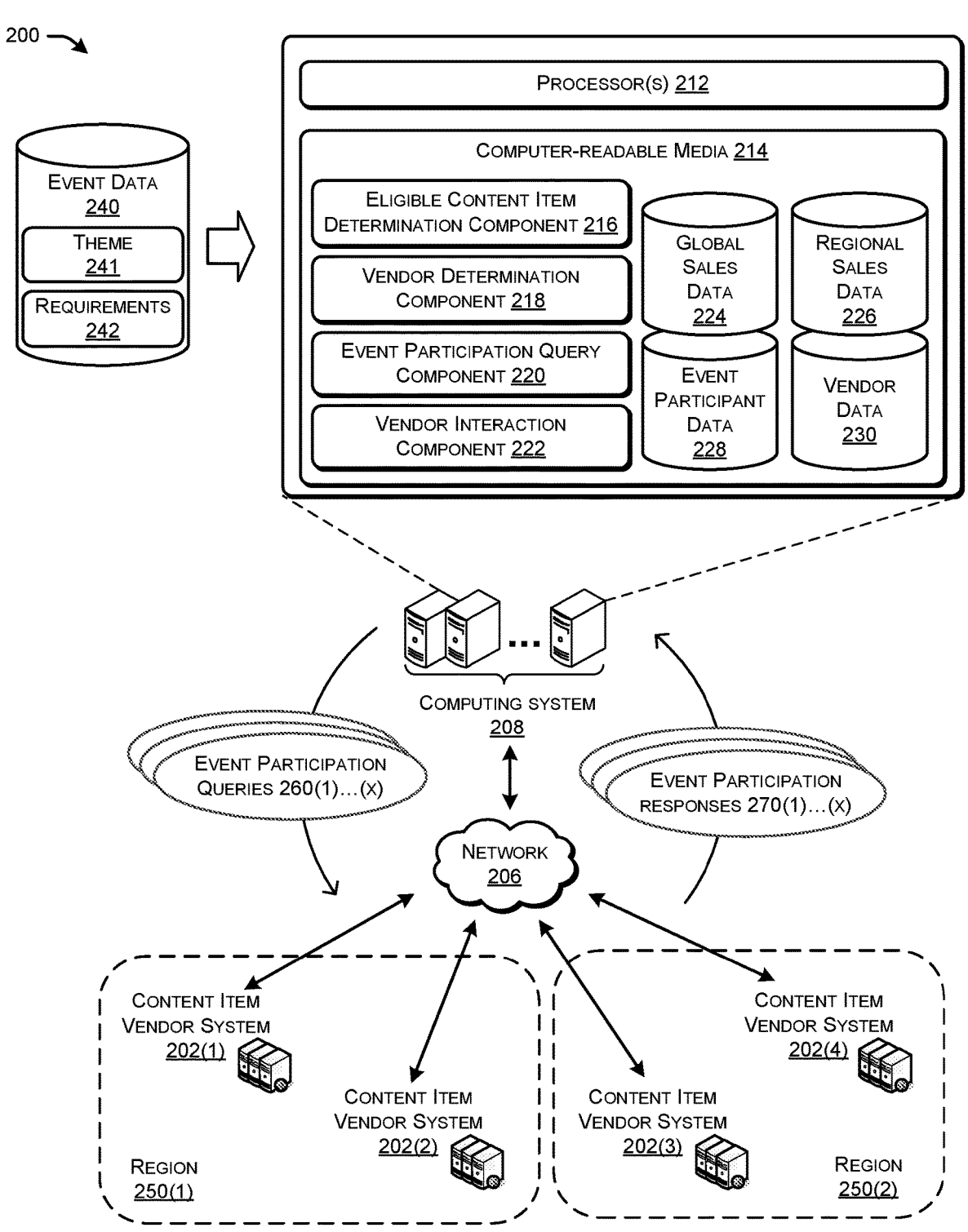
FIG. 2 is a diagram illustrating an example environment that includes a content distribution platform and multiple content vendor systems configured to implement the techniques described herein.

FIG. 2 is a diagram illustrating an example environment 200 that includes a content item vendor computing systems 202(1), 202(2), 202(3), and 202(4) (collectively, "vendor systems 202"). Vendor systems 202(1) and 202(2) may be located in a first region 250(1) while vendor systems 202(3) and 202(4) may be located in a second region 250(2). As illustrated, the vendor systems 202(1), 202(2), 202(3), and 202(4) may communicate with one or more other computing devices over a network 206. For example, the vendor systems 202(1), 202(2), 202(3), and 202(4) may communicate via the network 206 with a remote computing system 208 that is configured to determine content items to be associated with an event. The computing system 208 may also provide games and/or other content items to client computing devices (e.g., client devices 102 of FIG. 1). The remote computing system 208 may be a content provider system as described herein or any other device, system, or combination of devices and/or systems that may be suitable for implementing the disclosed techniques. The vendor systems 202 may be content item vendor systems as described herein or any other device, system, or combination of devices and/or systems that may be suitable for implementing the disclosed techniques. The vendor systems 202 and/or 208 may, in some instances, be part of a network-accessible computing platform that is maintained and accessible via the computer network 206.

In some embodiments, the computing system 208 may perform operations similar to those performed by the computing system 108 of FIG. 1 and may also act as, or have access to, a video game platform that implements a video game service to distribute games or any other type of content item to client devices, such as the client devices described herein.

The computing system 208 may solicit participation in events from content item vendor systems, such as vendor systems 202. The computing system 208 may determine one or more content items that are eligible for an event to generate a set of eligible content items. For example, the computing system 208 may receive or determine event data 240 that may include event theme data 241 (e.g., represented by one or more tags) and one or more event requirements 242 (e.g., sales requirements, rating or review requirements, etc.). The computing system 208 may determine the content items from among a current catalog of content items that are eligible for the event based on the event data 240 (e.g., based on the theme data 241 and/or the requirements 242). The computing system 208 may then determine an ordered ranking of this set of eligible content items based on one or more criteria as described herein (e.g., sales criteria, rating or review criteria, tag criteria, etc.).

The computing system 208 may initiate a solicitation process to register eligible content items for an event. For example, the computing system 208 may determine a subset of the set of eligible content items, such as a particular number (e.g., 10, 50, 100, etc.) of highest-ranked content items in the ranked set of eligible content items. The computing system 208 may then generate and transmit one or more initial event participation queries 260 to one or more of the vendor systems 202 that are associated with the determined highest-ranked content items. The computing system 208 may also set a deadline for receiving responses to the initial set of participation queries and start a timer, initiating the initial recruitment period for the event.

The participation queries 260 may take the form of any electronic communication, including email, text message, or any other form of electronic notification. The queries 260 may include information about the event and a request to register a vendor's content item for the event. For example, the query may indicate a theme of an event, a discount or minimum discount applied for the event, a timeframe of the event, a deadline for responding to the query, remaining slots for the event and/or slot details (e.g., days, times, etc.), etc. The query may direct the vendor to a registration site and/or provide a means of registering (e.g., a link in the query) or responding to the query. The query may further request information from the vendor system. For example, the queries 260 may request a specific slot or multiple slots, a specific discount, etc.

One or more of the vendor systems 202 may reply with one or more event participation responses 270. The responses may provide the information requested in the event participation queries 260 and/or otherwise register a content item associated with the response 270. The responses 270 may take the form of a reply email, a web form submission, and/or any other means of providing the responsive information described herein.

After the expiration of an initial event recruitment period, the computing system 208 may determine if there are any open slots remaining for the event. If so, the computing system 208 may determine a subsequent subset of the set of eligible content items, such as a particular number (e.g., 10, 50, 100, etc.) of next highest-ranked content items in the ranked set of eligible content items. In other examples, one or more of the same content items may be selected for the subsequent subset (and therefore one or more of the same vendor systems may be solicited again for participation in the event). The computing system 208 may generate and transmit participation queries to the corresponding vendor systems 202 to solicit content item participation in the event.

The computing system 208 may process replies to the participation queries as described herein, determine whether there are remaining slots for the event, solicit additional participation in the event if so, and so forth, until the recruitment period for the event has expired or until all slots have been filled.

FIG. 2 further illustrates example components of the computing system 208 for determining content items to be associated with an event. As illustrated, the computing system 208 may comprise one or more processors 212 (e.g., one or more central processing units (CPU(s)) and computer-readable media 214, as well as components stored thereon for determining event content items. The computer-readable media 214 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information, and which can be accessed by a computing device. The computer-readable media 214 may be implemented as CRSM, which may be any available physical media accessible by the processor(s) 212 to execute instructions stored on the computer-readable media 214. In one basic implementation, CRSM may include RAM and Flash memory. In other implementations, CRSM may include, but is not limited to, ROM, EEPROM, or any other tangible medium which can be used to store the desired information, which can be accessed by the processor(s) 212.

As illustrated, the computer-readable media 214 may store or otherwise have access to an eligible content item determination component 216, a vendor determination component 218, an event participation query component 220, and/or a vendor interaction component 222. In addition, the media 214 may store global sales data 224 storing global total and/or periodic sales data for content items; regional sales data 226 storing regional total and/or periodic sales data for content items; event participant data 228 that may include event and participant data, such as event slots, content items that have assigned to particular event slots, event times, event discount(s), recruitment time periods, etc.; and/or vendor data 230 that may include preferred vendor data, vendor-specified discount data, vendor content item data (e.g., the vendors associated with particular content item(s)), and/or any other vendor-related data as described herein.

The computing system 208 may receive the event data 240 that it may use to determine eligible content items and/or determine ordered sets of eligible content items. The event data 240 may include theme data 241 that may indicate one or more tags, categories, classifications, etc. that may serve as the theme of an event or otherwise be used to determine a subset of available content items that may be eligible for an event. The event data 240 may also, or instead, include requirements 242 that may further limit the subset of available content items that may be eligible for an event or otherwise be used to determine such a subset. For example, the requirements 242 may include minimum total and/or periodic sales requirements (e.g., global and/or regional), minimum ratings and/or review scores, minimum or maximum user participation levels, etc.

The eligible content item determination component 216 may function to determine, from among content items available to a content provider system such as the computing system 208, content items that are eligible for participation in an event. For example, the eligible content item determination component 216 may use the theme 241 and/or the requirements 242 of the event data 240 to identify content items from a catalog of available content items that may be associated with the theme 241 and/or meet the requirements 242. For example, the theme 241 may include one or more tags that the eligible content item determination component 216 may compare to tag(s) associated with content items. The eligible content item determination component 216 may determine that those items with the same tag(s) are eligible for the event. In this determination, a tag quantity or type may be used. For example, the theme 241 and/or requirements 242 may require that a content have a minimum number of user-applied tags of a particular type (e.g., racing, fighting, etc.). Alternatively or additionally, the theme 241 and/or requirements 242 may require that the evaluated content item tag be assigned by a vendor and/or a content provider, rather than by users.

The requirements 243 may further include other requirements for content item eligibility in an event as described herein (e.g., preferred vendor status, minimum discount, fixed discount, sales requirements, user participation requirements, rating or review requirements, etc.). In examples, the requirements 243 may also, or instead, include requirements related to one or more other events. For instance, a content item and/or a vendor may not be eligible to participate in more than one ongoing event at a time and therefore a content item currently participating in another event and/or items associated with a vendor currently participating in another event may not be eligible to participate in this event. In another example, there may be a "cool down" period such that a content item and/or a vendor may not be eligible to participate in a subsequent event for a period of time after participating in an earlier event. For instance, a content item that participated in a particular event may not be eligible to participate in a subsequent event for a period of time (e.g., a week, two weeks, 30 days, etc.) after the conclusion of the particular event. In another example, a vendor associated with a content item that participated in a particular event may not be eligible to have another of its content items participate in a subsequent event for a period of time (e.g., a week, two weeks, 30 days, etc.) after the conclusion of the particular event. In determining eligible content items, the eligible content item determination component 216 may access and/or retrieve data from global sales data 224, regional sales data 226, vendor data 230, etc. The eligible content item determination component 216 may store eligible content item data in event participation data 228 and/or in one or more other data stores.

The vendor determination component 218 may function to determine particular vendors and/or vendor data for content items. In examples, the vendor determination component 218 may determine, for event-eligible content items determined by the eligible content item determination component 216, a vendor associated with such content items. The vendor determination component 218 may further determine a means of interaction with such vendors (e.g., email address, notification preferences, etc.).

The event participation query component 220 may function to generate event participation queries, such as event participation queries 260, that may be provided to vendor systems to solicit participation for particular content items in an event. The event participation query component 220 may use data from the event data 240 to generate such queries. For example, the event participation query component 220 may include an indication of the theme 241 in the queries, the requirements 242 (e.g., for informational purposes), dates and times of the event, recruitment period information, numbers of slots, etc. The event participation query component 220 may also, or instead, use data from event participation data 228 in generating the queries, such as remaining slots in the event (if any), indications of other participants (e.g., content items and/or vendors) registered for the event, etc.

The vendor interaction component 222 may perform communications operations to interact with vendor systems, such as transmitting event participation queries 260 to the vendor systems 202 and/or receiving event participation responses 270 from the vendor systems 202. In various examples, the vendor interaction component 222 may generate one or more vendor interfaces (e.g., webpages, application programming interfaces (API), data interfaces, UIs, etc.) that may allow the vendor systems to register content items for an event. The vendor interaction component 222 may also (e.g., via generated interfaces) provide a means for the vendor systems to set or request event parameters, such as a discount amount, a desired slot, etc. The vendor interaction component 222 may further be configured to register and/or store event registration data (e.g., based on accepted participation queries), for example, at event participation data 228.

Note that in some examples, various functions and/or components may be distributed across multiple devices, including client devices. For example, one or more of the eligible content item determination component 216, the event participation query component 220, and/or the vendor interaction component 222 may be configured on one or more of the vendor systems 202 and/or other systems configured to interact with the computing system 208. Any such systems, other devices, and/or any combination thereof, may be configured to perform any one or more of the functions described herein (e.g., using the data as described herein) in regard to those and similar components.

Figure 3:
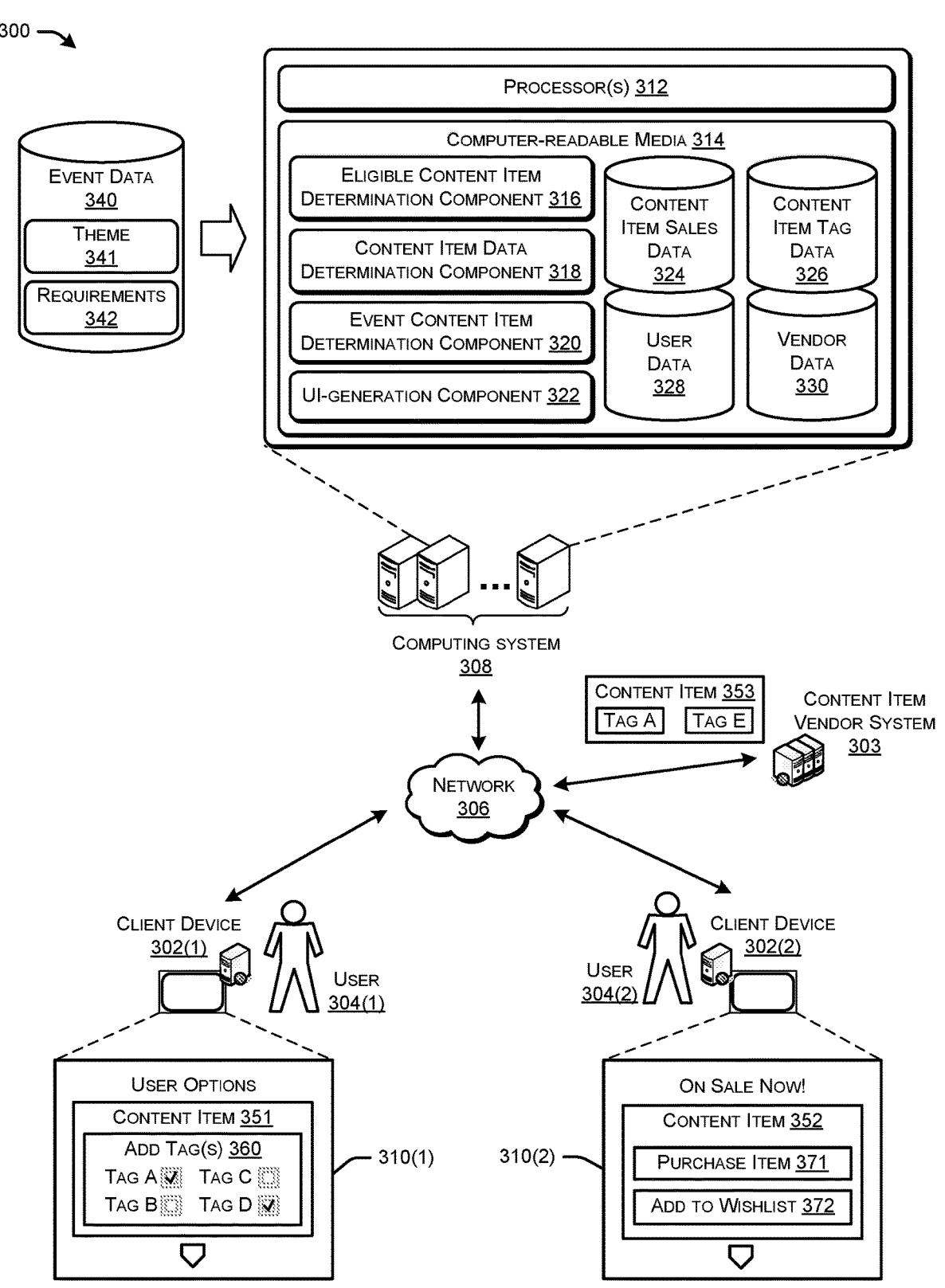
FIG. 3 is a diagram illustrating an example environment that includes a content distribution platform, a content vendor system, and multiple client computing devices configured to implement the techniques described herein.

FIG. 3 is a diagram illustrating an example environment 300 that includes client devices 302(1) and 302(2) (collectively, "devices 302") that may be client devices similar to those of FIG. 1. The environment 300 may further include one or more content item vendor systems, such as a content item vendor system 303. The devices 302 and vendor system 303 may communicate with one or more other computing devices over a network 306. For example, the devices 302 and vendor system 303 may communicate via the network 306 with a remote computing system 308 that is configured to dynamically determine content items to be associated with an event. The computing system 308 may also provide games and/or other content items to client computing devices (e.g., client devices 302 and/or client devices 102 of FIG. 1). The remote computing system 308 may be a content provider system as described herein or any other device, system, or combination of devices and/or systems that may be suitable for implementing the disclosed techniques. The vendor system 303 may be a content item vendor system as described herein or any other device, system, or combination of devices and/or systems that may be suitable for implementing the disclosed techniques. The computing systems and devices 302, 303, and/or 308 may, in some instances, be part of a network-accessible computing platform that is maintained and accessible via the computer network 306.

In some embodiments, the computing system 308 may perform operations similar to those performed by the computing system 108 of FIG. 1 and/or the computing system 208 of FIG. 2, and may also act as, or have access to, a video game platform that implements a video game service to distribute games or any other type of content item to client devices, such as the client devices described herein.

The computing system 308 may dynamically evaluate content items for eligibility for participation in events. The computing system 308 may detect changes within the environment 300 that may affect whether one or more content items are eligible for an event. If there is a content item eligibility change due to a change in data associated with a particular content item, the computing system 308 may determine whether to add that content item to a particular set of eligible content items, remove that content item from that set of eligible content items, or take no actions in regard to that set of eligible content items based on the change in content item data.

For example, the computing system 308 may receive or determine event data 340 that may include event theme data 341 (e.g., represented by one or more tags) and one or more event requirements 342 (e.g., sales requirements, rating or review requirements, etc.). The computing system 308 may determine the content items from among a current catalog of content items that are eligible for the event based on the event data 340 (e.g., based on the theme data 341 and/or the requirements 342) to generate an initial ordered ranking of this set of eligible content items based on one or more criteria as described herein (e.g., sales criteria, rating or review criteria, tag criteria, etc.). The computing system 308 may then, while the event and/or the event recruitment period is ongoing, evaluate any content items for which a data modification was detected for eligibility to participate in the event.

A user 304(1) may operate the client device 302(1) to navigate to a webpage or the like associated with the computing system 308 and, in response, the computing system 308 may cause the client device 302(1) to present a 310(1) on a display of the client device 302(1). In some instances, this UI 310(1) may include information regarding one or more video games and/or other content items available to the user 304(1) and/or from the computing system 308. For instance, the UI 310(1) may include user-selectable tags 360 that may be associated with a content item 351. In examples, a content provider of the content item 351 may encourage users to apply their own tags to obtain richer descriptive data for the content item 351 (and other items offered by the content provider). These user-selected tags may be tracked and stored by the computing system 308, for example as tag data in content item tag data 326. In some examples, a user may also be able to remove a tag previously applied by that user. The computing system 308 may track a number of each particular tag applied to a content item and may use this number in various operations. For example, the computing system 308 may determine that items with 1,000 or more of a particular tag are eligible for participation in an event with a theme associated with that particular tag. As shown in this figure, the user 304(1) may have selected tag A and tag D to be applied to the content item 351. The computing system 308 may detect these selections and associate tag A and tag D with the content item 351 and/or increment a tag counter for tag A and a tag counter for tag D associated with the content item 351.

The computing system 308 may detect this change in tag data associated with the content item 351. In response, the computing system 308 may evaluate the content item 351 for eligibility for any currently recruiting and/or ongoing events. For example, if the tag A counter associated with the content item 351 now totals 1,000 due to the selection of tag A by the user 304(1), the computing system 308 may determine that the content item 351 is now eligible for an event with a requirement of 1,000 or more applications of tag A. Alternatively, if the tag D counter associated with the content item 351 now totals 999 due to the selection of tag D by the user 304(1), the computing system 308 may determine that the content item 351 remains ineligible for an event with a requirement of 1,000 or more applications of tag D. In examples, such modifications to eligibility may be temporally buffered to avoid rapid and/or potentially disruptive changes to content item eligibility. For example, a content item that drops below an eligibility threshold may remain eligible for a period of time (e.g., a day, a week, a month, etc.) regardless, so that it is not removed and then determined to be eligible again shortly thereafter. This may be helpful for content items with attributes having values that are relatively close to a threshold and that may therefore rapidly rise above and fall below such thresholds in a short period of time. Similar buffering may also, or instead, be used to establish eligibility so that items are not determined to be eligible until they have established attributes with values above an eligibility threshold for a period of time (e.g., a day, a week, a month, etc.).

A user 304(2) may operate the client device 302(2) to navigate to a webpage or the like associated with the computing system 308 and, in response, the computing system 308 may cause the client device 302(2) to present a 310(2) on a display of the client device 302(2). In some instances, this UI 310(2) may include information regarding one or more video games and/or other content items available to the user 304(2) and/or from the computing system 308. For instance, the UI 310(2) may include a purchase control 371 that may allow the user 340(2) to purchase a content item 352 and a wish list control 372 that may allow the user 340(2) to add the content item 352 to a wish list associated with the user 340(2). Purchase and/or wish list data may be tracked and stored by the computing system 308, for example as purchase data in content item sales data 324 and/or as user wish list data in user data 328. In some examples, a user may also be able to remove (e.g., return) a purchase previously made by that user and/or remove a content item from the user's wish list. The computing system 308 may track a number of purchases or wish list inclusions for use in various operations. For example, the computing system 308 may determine that items purchased by 10,000 or more users or included in a wish list for 5,000 or more users are eligible for participation in an event. The computing system 308 may detect the user 304(2)'s selection of the control 372 and/or the control 372 and store associated purchase and/or wish list data.

The computing system 308 may detect this change in purchase and/or wish list data associated with the content item 352. In response, the computing system 308 may evaluate the content item 352 for eligibility for any currently recruiting and/or ongoing events. For example, if a purchase by the user 304(2) of the content item 352 results in a new global total of 10,000 purchases for that content item, the computing system 308 may determine that the content item 352 is now eligible for an event with a requirement of at least 10,000 or more global content item sales. Alternatively or additionally, if a purchase by the user 304(2) of the content item 352 results in a new regional total of 10,000 purchases for that content item in user 304(2)'s region, the computing system 308 may determine that the content item 352 is now eligible for an event with a requirement of at least 10,000 or more regional content item sales. Similarly, if a request to add the content item 352 to a wish list associated with the user 304(2) results in a new global or regional total of 5,000 wish list inclusions for that content item, the computing system 308 may determine that the content item 352 is now eligible for an event with a requirement of at least 5,000 or more global or regional wish list inclusions.

Newly added and/or removed content items may be similarly evaluated upon detection. For example, a content item vendor system 303 may transmit or otherwise provide a content item 353 to the computing system 308. The computing system 308 may make the content item 353 available to users (e.g., users 304) for use, purchase, download, streaming, etc. The vendor system 303 may include or associate a tag A and a tag E with the content item 353. The computing system 308 may detect the addition of the content item 353 to the content item catalog and, in response, may evaluate the content item 353 for eligibility for any currently recruiting and/or ongoing events. For example, if an event is ongoing that requires a tag A or a vendor-applied tag A (as opposed to a user-applied tag A), the computing system 308 may determine that the content item 353 is eligible for that event, assuming other requirements are met. Alternatively, if an event is ongoing that requires a tag E (or a vendor-applied tag E) and 10,000 purchases, the computing system 308 may determine that the content item 353 is ineligible for that event despite having the appropriate tag because it has fewer than 10,000 purchases (e.g., no purchases because it has just been added to the catalog). Alternatively, if an event is ongoing that requires a tag E (or a vendor-applied tag E) and is focused on highlighting newly added content items, the computing system 308 may determine that the content item 353 is eligible for that event because it has the appropriate tag and it has been newly added.

Likewise, the content item vendor system 303 may transmit or otherwise provide a request to remove the content item 353 from the catalog associated with the computing system 308. The computing system 308 may remove the content item 353 from availability to users (e.g., users 304) for use, purchase, download, streaming, etc. The computing system 308 may also remove the content item 353 from any sets of eligible content items in which it may have been included and/or from any ongoing events.

FIG. 3 further illustrates example components of the computing system 308 for dynamically determining content items to be associated with an event. As illustrated, the computing system 308 may comprise one or more processors 312 (e.g., one or more central processing units (CPU(s)) and computer-readable media 314, as well as components stored thereon for dynamically determining event content items. The computer-readable media 314 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information, and which can be accessed by a computing device. The computer-readable media 314 may be implemented as CRSM, which may be any available physical media accessible by the processor(s) 312 to execute instructions stored on the computer-readable media 314. In one basic implementation, CRSM may include RAM and Flash memory. In other implementations, CRSM may include, but is not limited to, ROM, EEPROM, or any other tangible medium which can be used to store the desired information, which can be accessed by the processor(s) 312.

As illustrated, the computer-readable media 314 may store or otherwise have access to an eligible content item determination component 316, a content item data determination component 318, an event content item determination component 320, and/or a UI-generation component 322. In addition, the media 314 may store content item sales data 324 storing global, regional, total, and/or periodic sales data for content items; content item tag data 326 storing tag data for content items; user data 328 storing user wish list data, user preferences, user histories, and/or user account data; and/or vendor data 330 that may include preferred vendor data, vendor-applied tag data, vendor content item data (e.g., the vendors associated with particular content item(s)), and/or any other vendor-related data as described herein.

The computing system 308 may receive event data 340 that it may use to determine eligible content items and/or determine ordered sets of eligible content items, for example, as described herein. The event data 340 may include theme data 341 that may indicate one or more tags, categories, classifications, etc. that may serve as the theme of an event or otherwise be used to determine a subset of available content items that may be eligible for an event. The event data 340 may also, or instead, include requirements 342 that may further limit the subset of available content items that may be eligible for an event or otherwise be used to determine such a subset. The requirements 342 may include any one or more of the requirements described herein and/or any other event requirements, such as minimum total and/or periodic sales requirements (e.g., global and/or regional), minimum ratings and/or review scores, minimum or maximum user participation levels, etc.

The eligible content item determination component 316 may function to determine, from among content items available to a content provider system such as the computing system 308, content items that are eligible for participation in an event (e.g., as described herein, for example in regard to FIG. 2 and the eligible content item determination component 216). In examples, the eligible content item determination component 316 may receive one or more indications or other data associated with modified or updated content item data or a newly added content item, for example, from the content item data determination component 318. In response, the eligible content item determination component 316 may determine if the updated or newly added content item is now eligible to participate in an event that it was not previously eligible for, for example based on the event data 340 (e.g., theme 341 and/or requirement 342). If so, a vendor system associated with the content item may be solicited for participation and/or the content item may be added to a set of eligible content items for potential solicitation for participation, for example as described herein. The eligible content item determination component 316 may also, or instead, determine if the updated content item is no longer eligible to participate in an event that it was previously eligible for, for example based on the event data 340 (e.g., theme 341 and/or requirement 342). If so, the content item may be removed from a set of eligible content items, for example as described herein.

The content item data determination component 318 may function to monitor and/or otherwise detect changes in content item data, including the addition or removal of content items from a catalog associated with the computing system 308. For example, the content item data determination component 318 may detect a change to tags (e.g., using content item tag data 326 and/or vendor data 330), purchase data (e.g., using content item sales data 324), wish list data (e.g., using user data 328), etc. for a content item. The content item data determination component 318 may also detect the addition of a content item to the set of content items available to the computing system 308 or the removal of a content item from the set of content items available to the computing system 308 (e.g., based on vendor data 330). Based on such detections or associated determinations, the content item data determination component 318 may notify or otherwise indicate the modified, added, or removed content item(s) to the eligible content item determination component 316 and/or the event content item determination component 320. As described above, the eligible content item determination component 316 may then determine whether the indicated content item is now eligible for an event and/or is no longer eligible for an event. As described in more detail below, the event content item determination component 320 may then determine whether the indicated content item is now to be included in an active, ongoing event and/or should be removed from an active, ongoing event.

The event content item determination component 320 may function to determine if a content item associated with an active event should be removed from that event or if a content item not currently associated with an active event should be added to that event. For example, the content item data determination component 318 may detect a change in data for a content item, such as the periodic sales for the content item have dropped or review data has changed. The content item data determination component 318 may indicate this change in content item data to the event content item determination component 320, which may be configured to evaluate whether the content item remains eligible to participate in ongoing events in which it may be currently participating. For example, if the content item is currently participating in an ongoing event limited to content items with a particular periodic purchase minimum, such as at least 10,000 average monthly purchases, and the change in content item data indicates that the content item has dropped to an average of 9,500 monthly purchases, the event content item determination component 320 may remove the content item from that event.

In another example, the computing system 308 may be configured to allow content items to be added to events after they have begun (e.g., if there were remaining slots, based on vendor or user demand, etc.). In such an example, the content item data determination component 318 may detect a change in data for a content item, such as the total global sales for the content item has increased. The content item data determination component 318 may indicate this change in content item data to the event content item determination component 320, which may be configured to evaluate whether the content item is now eligible to participate in ongoing events in which it was not currently participating. For example, if the content item is not currently participating in an event limited to content items with a particular global purchase minimum, such as at least 100,000 purchases, and the change in content item data indicates that the content item has just exceeded 100,000 purchases, the event content item determination component 320 may add the content item to that event.

The UI-generation component 322 may generate a UI for presentation on a client device. For example, the UI-generation component 322 may present content item data and content item controls, such as selectable tags 360 for content item 351 presented in UI 310(1) and/or purchase control 371 and wish list control 372 for content item 352 presented in UI 310(2). The UI-generation component 322 may further generate UIs and/or other interfaces (e.g., data interfaces, APIs, etc.) that may interact with vendor systems such as vendor system 303 to receive and/or provide vendor, content item, and/or event participation data.

Note that in some examples, various functions and/or components may be distributed across multiple devices, including client devices. For example, one or more of the eligible content item determination component 316, the content item data determination component 318, the event content item determination component 320, and/or the UI-generation component 322 may be configured on one or more of the client devices 302, vendor system 303, and/or other systems configured to interact with the computing system 308. Any such systems, other devices, and/or any combination thereof, may be configured to perform any one or more of the functions described herein (e.g., using the data as described herein) in regard to those and similar components.

FIG. 4 illustrates a flow diagram of an example process 400 for determining content items associated with an event for presentation to a user on a UI. This process, and each process described herein, is illustrated as a collection of blocks in a logical flow graph that represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some instances, the computing systems 108, 208, and/or 308 may be configured to perform some or all of the operations, although in other instances other devices may additionally or alternatively perform some or all of the operations. For instance, some or all of the techniques and/or operations described herein may be performed on the client devices and/or vendor systems in some instances.

At an operation 402, a request may be received at a content provider system from a user computing device for event content items. This may be a request for a web page, a request for a user home page provided by a content provider (e.g., video game provider), a request generated in response to activation of a control (e.g., activation of a navigation control requesting presentation of an interface that is configured to present event content items), and/or any other form of request that may be received at a content provider system from a user system that may initiate the generation of a UI or other form of presentation that may include one or more content items associated with an event At operation 404, the content provider system may determine a set of content items that may be participating in an event, for example, the event associated with the request received at operation 402. This set of content items may be items that are candidates for presentation as event content items to a user in a UI. The content provider system may also, at operation 404, order this set of event content items based on one or more global criteria, such as global sales, reviews, ratings, wish list inclusions, etc.

At operation 406, the content provider system may also, or instead, determine an order for the set of event content items based on one or more regional criteria, such as regional sales, reviews, ratings, wish list inclusions, etc. The content provider system may determine a region to use in this operation based on the user. For example, the content provider system may determine and use the user's region (e.g., based on user data, user history user purchases, etc.). This set of content items may also be items that are candidates for presentation as event content items to a user in a UI. In examples, the content provider system may generate two sets of candidate event content items, one ranked by one or more global criteria at operation 404 and one ranked by one or more regional criteria at operation 406. As will be appreciated, based on the ordering criteria, the candidate content items for a particular region may differ from global candidate items. For example, the top-selling content item in a particular region may be different from the top-selling content item globally.

At operation 408, the content provider system may determine an ordered set of candidate content items for consideration as event content items presented to the user for the event. As described herein, this ordering of potential presentation event content items may be based on any one or more criteria, such as sales, user participation, tags, wish list inclusions, content item age, and/or any other criteria.

At operation 410, the content provider system may filter those content items already owned, subscribed to, or otherwise associated with the user from the ordered set of candidate content items for consideration as event content items. For example, the content provider system may remove those content items that the user has already purchased from the set of content items to avoid promoting content items to a user that the user already owns.

At operation 412, the content provider system may filter the remaining content items based on user preferences, user content consumption history data, user content consumption pattern data, and/or other user data. For example, the content provider system may elevate and/or remove those content items that the user has indicated in some manner (e.g., using indications of blocked and/or preferred tags, content, franchises, groupings, etc.) the user is or is not interested in. Alternatively, the content provider system may evaluate user history and elevate and/or remove those items that are similar in some way to items that the user has preferred and/or avoided (e.g., items with tags similar to and/or not associated with other content items that the user has purchased). Alternatively or additionally, the content provider system may reorder the items based on user history and promote those items more likely to be appealing to the user (e.g., move items in the user's wish list to the top of the ordered set).

At operation 414, the content provider system may determine and present, to the user in a UI, a subset of the set of content items determined at operation 412. For example, a UI may be configured to present three sale items at any one time. The content provider system may determine the top three items from the set of filtered candidate event content items and configure the UI to present these three items to the user. Any number and presentation manner may be used at operation 414 in generating a UI.

FIG. 5 illustrates a flow diagram of an example process 500 for determining content items for an event. This process may be performed by a content provider system as described herein or any other computing device.

At an operation 502, a content provider system may determine one or more event parameters for an event. For example, an operator may configure an event at the content provider system or otherwise provide event parameters to the content provider system. Event parameters may include any of the event data, attributes, properties, characteristics, etc. described herein and/or any other parameters that may be associated with an event. Examples of event parameters include event participation requirements for content items, such as a theme (indicated in any suitable manner, including as one or more tags or tag data and/or minimum tag application thresholds), sales minimums (global and/or regional), review and/or rating requirements, user participation requirements, content item minimum and/or maximum age, etc. Examples of event parameters may also, or instead, include event boundaries, such as an event start time and end time, a recruitment period start time and end time, a number of slots (e.g., in total, per time period (e.g., hour, day, week, etc.)), etc. Other event parameters may include financial requirements, such as the discount to be applied during the event, the minimum and/or maximum discount that a vendor may request, etc. Event parameters may also include a limitation to preferred vendors and/or a requirement that preferred vendors be offered slots in the event before non-preferred vendors.

At operation 504, the content provider system may determine one or more content items that are eligible for participation in the event based on the event parameters determined at operation 502. For example, the content provider system may determine, from among a catalog of content items available to the content provider system, those content items that have one or more tags corresponding to a theme indicated in event parameters. Alternatively or additionally, the content provider system may determine, from among the catalog of available content items, those content items that meet the sales requirements, review requirements, rating requirements, wish list requirements, age requirements, user participation requirements, and/or any other requirements for participation in the event indicated in the event parameters. Further at operation 504, the content provider system may order the eligible content items based on one or more criteria, as described herein. For example, the content provider system may order the items based on sales, wish list inclusion, other popularity criteria, vendor preference status, user participation, etc. The content item satisfying these requirements may form the set of eligible content items used by the content provider system to determine event content items.

At operation 506, the content provider system may determine an initial subset of content items from the ordered set of eligible content items. In examples, the content provider system may select a set number of the top content items in the ordered set of eligible content items (e.g., the first 5, 10, 25, 50, etc.). In other examples, the content provider system may select globally high-selling games for the initial subset over regionally high-selling games, or vice versa. In other examples, the content provider system may randomly select a number of content items from the ordered set of eligible content items. Any other techniques may be used to determine this initial subset of content items.

At operation 508, the content provider system may transmit event participation queries to vendor systems that are associated with the content items in the initial subset determined at operation 506. These queries may include any query data and information as described herein, including an indication of the initial recruitment period or a deadline by which a response may be required, discounts associated with or available for the sale, event slot details (e.g., times and dates available, remaining slots, taken slots, etc.), a means of registering content items for the event (e.g., a link to a web page or interface that may facilitate registration), etc.

At operation 510, the content provider system may receive or otherwise determine responses to queries from vendor systems and/or registrations for the event performed responsive to the queries. For example, where responses are emailed, the content provider system may register content items in response to receiving such emails. Where registrations are performed via a user interface or API, the content provider system may detect such registrations based on registration data generated by such interface registrations. Any other operations may be performed to complete content item registration for an event and/or determine content items that are associated with an event based on query responses.

At operation 512, the content provider system may determine, for example, at the expiration of the initial recruitment period or response deadline, the content items that have been successfully registered for or otherwise associated with the event. Further at 512, the content provider system may determine if there are any vacant slots for the event remaining and/or if there is any portion of the recruitment period remaining. If all slots have been filled for the event and/or if the recruitment period is over, at operation 520, the content provider system may finalize or otherwise associate the registered content items with the event.

However, if the content provider system determines at operation 512 that there are slots and recruitment period time remaining, at operation 514 the content provider system may determine a subsequent subset of content items from the ordered set of eligible content items. Here again, any of a variety of techniques may be used to determine this subsequent subset of content items. For example, the next highest selling set of content items (below the highest selling set of content items used for the initial subset of content items) may be selected, a next subset may be selected that does not require preferred vendor status, the next highest rated content items may be selected, the subset may be selected based on age, etc. Here again, a random selection of content items may be selected as the subsequent subset, etc. In some examples, subsets, such as the initial subset of content items and the subsequent subset of content items may be mutually exclusive (e.g., no content items may be in both subsets), while in other examples, items may overlap subsets. For example, each vendor system may have only one opportunity to register for an event. Alternatively, one or more vendor systems may be repeatedly solicited for an event (e.g., because they are associated with a preferred vendor status, the content item is a global best-seller, etc.).

At operation 516, participation queries may be transmitted to the vendor systems associated with the subsequent subset of content items determined at operation 514. This solicitation may be similar to that of operation 508 and the associated queries may include any data and/or information as described herein for participation queries.

At operation 518, participation query responses may be received and/or registrations may be detected and/or determined in a similar manner as that described in regard to operation 510 and/or as otherwise described herein.

The process 500 may then return to operation 512 for a determination of whether there are slots and/or recruitment time remaining for the event. If so, the process 500 may again determine a subsequent subset of content items for solicitation at operation 514 and so forth. The process 500 may repeat in this manner until all slots are filled for an event or until an event recruitment period has expired.

In some examples, there may be no recruitment period for an event. Instead, the event may be open for participation by eligible content items throughout the duration of the event. Solicitation for such an event may occur in a round-robin fashion, with the initial subset of content items begin solicited again after a final subset of content items have been solicited and there are still remaining slots for the event. Alternatively, the content provider system may randomly select a subset of content items for each iteration of solicitation, in some examples excluding a solicited subset for a period of time and/or a number of solicitations before including the associated content items into the set of content items from which a subset of content items may be randomly selected. Any other manner and techniques of determining subsets and orders of soliciting participation in an event may also, or instead, be used according to the disclosed examples.

Figure 6:
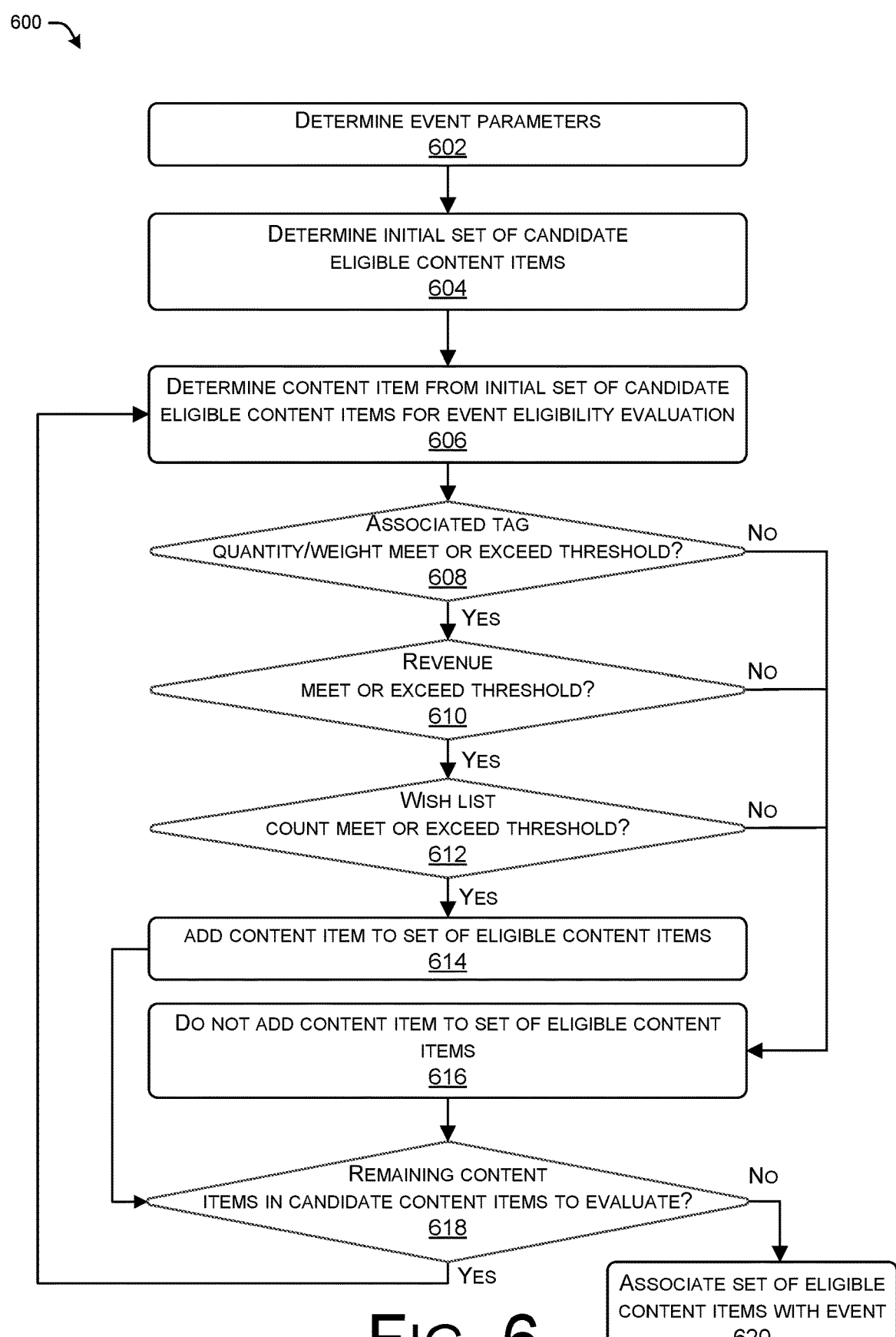
FIG. 6 is a flow diagram of an example process for determining content items associated with an event in accordance with examples of the disclosure.

FIG. 6 illustrates a flow diagram of an example process 600 for determining whether a content item is eligible for an event based on multiple criteria. This process may be performed by a content provider system as described herein or any other computing device. Note that the process 600 describes using several example criteria to determine whether a particular content item is eligible for an event, but other criteria may be evaluated also, or instead, according to the instant disclosure.

At an operation 602, a content provider system may determine one or more event parameters for an event. As described herein, an operator may configure an event at the content provider system or otherwise provide event parameters to the content provider system. Event parameters may include any of the event data, attributes, properties, characteristics, etc. described herein and/or any other parameters that may be associated with an event. In this example, the exemplary event parameters of minimum tag applications, minimum revenue, and minimum wish list inclusions will be described, but other parameters may also, or instead, be used.

At operation 604, the content provider system may determine an initial set of content items that may be eligible for participation in the event, for example, based on one of the event parameters determined at operation 602. For example, the content provider system may determine, from among a catalog of content items available to the content provider system, those content items that may be associated with a particular theme indicated in the event parameters. Alternatively or additionally, the content provider system may determine, using any other criteria, an initial set of candidate eligible content items. In examples, this initial set of candidate eligible content items may be the set of all available content items globally or for a particular region. The items in the initial set of candidate eligible content items may be ordered according to any criteria, including those described herein.

At operation 606, the content provider system may determine a particular content item from the initial set of candidate eligible content items for evaluation. The item may be determined randomly or based on an ordering of the initial set of candidate eligible content items. Note that while the serial evaluation of single items is described in this example, multiple items may be evaluated in parallel using the operations of this process and all such examples are contemplated as within the scope of the instant disclosure.

At operation 608, the content provider system may determine whether the content item determined at operation 606 meets the tag requirements indicated in the event parameters. For example, the event parameters determined at operation 602 may include a minimum number of user applications of a particular tag (e.g., the tag associated with the theme of the event). Alternatively or additionally, the event parameters determined at operation 602 may include a minimum tag weight for a particular tag (e.g., the tag associated with the theme of the event). A tag weight may be determined by the entity applying the tag. For example, a vendor-applied tag may have a greater weight than a user-applied tag (e.g., may count as 2, 20, 100 user-applied tags). Similarly, a premium or preferred user-applied tag may have a greater weight than a normal user-applied tag (e.g., may count as 2, 5, 10 normal user-applied tags). Other means or techniques of weighting tags may be used.

If, at operation 608, the applied tag quantity and/or weight does not meet or exceed a required tag threshold, the process 600 may move to operation 616 where the content item is not added to the set of eligible content items for the event. Then, at operation 618, the content provider system may determine whether there are additional content items remaining in the set of candidate items to evaluate for eligibility with this particular event. If so, the process 600 may return to operation 606 to determine and evaluate the next candidate content item. If there are no remaining content items in the set of candidate items to evaluate for eligibility, at operation 620 the content provider system may finalize or otherwise associate the set of eligible content items with the event, for example, for participation solicitation as described herein.

If, at operation 608, the content provider system determines that the applied tag quantity and/or weight for the candidate content item meets or exceeds a required tag threshold, at operation 610 the content provider system may determine whether the revenue associated with the candidate content item meets or exceeds a revenue threshold for the event. For example, the event parameters determined at operation 602 may include a minimum total global and/or regional quantity and/or value of sales and/or a minimum periodic global and/or regional quantity and/or value of sales. The event parameters determined at operation 602 may also, or instead, include relative sales amounts, such as a minimum relative global and/or regional quantity and/or relative value of sales (e.g., at least in the top 100 of global content item sales, top 1000 of regional content item sales, etc.) and/or a minimum periodic relative global and/or regional quantity and/or relative value of sales (e.g., at least in the top 100 of global content item sales for this month, top 1000 of regional content item sales for this week, etc.). Alternatively or additionally, the event parameters determined at operation 602 may include other revenue requirements, such as a minimum average number and/or value of in-game sales, a minimum average number and/or value of games purchased that are advertised in the content item, etc. Any type of sales, purchase, and/or revenue data may be used as a requirement of eligibility for an event.

If, at operation 610, the candidate content item revenue does not meet or exceed a required revenue threshold, the process 600 may move to operation 616 where the content item is not added to the set of eligible content items for the event. As described, at operation 618, the content provider system may determine whether there are additional content items remaining in the set of candidate items to evaluate for eligibility with this particular event. If so, the process 600 may return to operation 606 to determine and evaluate the next candidate content item. If there are no remaining content items in the set of candidate items to evaluate for eligibility, at operation 620 the content provider system may finalize or otherwise associate the set of eligible content items with the event, for example, for participation solicitation as described herein.

If, at operation 610, the content provider system determines that the candidate content item meets or exceeds a required revenue threshold, at operation 612 the content provider system may determine whether the candidate content item has been added to a threshold number of wish lists. For example, the event parameters determined at operation 602 may include a minimum number of wish list inclusions. Alternatively or additionally, the event parameters determined at operation 602 may include requirements associated with one or more other indications of popularity or desirability for a content item.

If, at operation 612, the candidate content item revenue does not meet or exceed a required wish list inclusion threshold, here again, the process 600 may move to operation 616 where the content item is not added to the set of eligible content items for the event. As described, at operation 618, the content provider system may determine whether there are additional content items remaining in the set of candidate items to evaluate for eligibility with this particular event. If so, the process 600 may return to operation 606 to determine and evaluate the next candidate content item. If there are no remaining content items in the set of candidate items to evaluate for eligibility, at operation 620 the content provider system may finalize or otherwise associate the set of eligible content items with the event, for example, for participation solicitation as described herein.

If, at operation 612, the content provider system determines that the candidate content item meets or exceeds a required wish list inclusion threshold, at operation 614 the content provider system may add the candidate content to the set of eligible content items for the event. Then, at operation 618, the content provider system may determine whether there are additional content items remaining in the set of candidate items to evaluate for eligibility with this particular event. If so, the process 600 may return to operation 606 to determine and evaluate the next candidate content item. If there are no remaining content items in the set of candidate items to evaluate for eligibility, at operation 620 the content provider system may finalize or otherwise associate the set of eligible content items with the event, for example, for participation solicitation as described herein.

Note that while example process 600 is described as requiring that a content item satisfy all three exemplary event requirements (tag quantity or weight, revenue, and wish list inclusion) for inclusion in the set of eligible content items for the event, in other examples, satisfaction of one or a subset of requirements may be sufficient to include a content item in a set of eligible content items for an event. For example, using these example requirements, in an alternative implementation, any content item that satisfies any one of the tag quantity or weight, revenue, or wish list inclusion requirements may be included in the set of eligible content items for an event at operation 620.

FIG. 7 illustrates a flow diagram of an example process 700 for dynamically determining content item eligibility for participation in an event. This process may be performed by a content provider system as described herein or any other computing device. Note that the process 700 describes using several example content item parameters that may be monitored and/or detected to determine whether a particular content item has become eligible or ineligible for an event, but other criteria may be evaluated also, or instead, according to the instant disclosure.

At operation 702 a content item parameter change may be determined. In examples, a content provider system may monitor various data that may be associated with a content item and that may be relevant to event participation eligibility. For example, data associated with a content item that, if modified, may trigger an evaluation of the content item's eligibility for participation in an event may include sales and/or popularity data (e.g., global and/or regional total and/or periodic sales ranking, global and/or regional wish list inclusions, etc.), tag data (e.g., tags applied and/or removed by users), and any other content item data and/or event eligibility data described herein. In examples, such modifications to eligibility may be temporally buffered to avoid rapid and/or potentially disruptive changes to content item eligibility. For example, a content item determined at operation 702 to drop below an eligibility threshold may remain eligible for a period of time (e.g., a day, a week, a month, etc.) regardless, so that it is not removed and then determined to be eligible again shortly thereafter. Here again, this may be helpful for content items with attributes having values that are relatively close to a threshold and that may therefore rapidly rise above and fall below such thresholds in a short period of time. Similar buffering may also, or instead, be used at operation 702 to establish eligibility so that items are not determined to be eligible until they have established attributes with values above an eligibility threshold for a period of time (e.g., a day, a week, a month, etc.).

The addition or removal of a content item from a content provider's catalog may also be monitored and trigger an event participation eligibility evaluation. For example, if a particular game is added to a catalog, the data associated with the game may then be automatically used (e.g., upon detection of the addition) to determine if the game qualifies for a sale. Likewise, if a game is removed from the catalog, the content provider system may automatically (e.g., upon detection of the removal) determine that the game can no longer participate in any sales hosted by the content provider. For the purposes of this disclosure, a content item associated with modified data or that has been added or removed from a catalog may be referred to generally as an "updated" content item.

At operation 704, in response to determining a change in data associated with a particular content item that may affect event participation eligibility, the content provider system may determine one or more current events and/or the parameters associated with the updated event. For example, the content provider system may determine one or more (e.g., all) events currently in a recruitment period and/or one or more (e.g., all) events currently ongoing that may permit content item participation after event initiation. The content provider system may also, at this operation, determine the requirements and other parameters of the event needed to determine whether a content item is eligible to participate in the event (e.g., as described herein).

At operation 706, the content provider system may determine an event from the set of current events determined at operation 704 for which to evaluate the updated content item's participation eligibility. Note that while the serial evaluation of single events for a particular content item is described in this example, multiple events may be evaluated for one or more content items in parallel using the operations of this process, and all such examples are contemplated as within the scope of the instant disclosure.

At operation 708, the content provider system may determine whether the updated content item is currently associated with the event determined at operation 706. For example, the content provider system may determine if the updated content item is currently participating in an ongoing event and/or if the updated content item is included in a set of eligible content items for that event. If not, the process may move to operation 714 for a determination of whether the updated content item is now eligible for the event.

If the updated content item is already associated with the event in some way, at operation 710, the content provider system may determine if the updated content item remains eligible for participation in the event. In examples, the content provider system may evaluate the updated content item against one or more (e.g., all) of the event requirements and/or parameters to determine eligibility. Alternatively, the content provider system may evaluate (e.g., only) the updated or modified content item data against one or more corresponding event requirements and/or parameters. Any of the content item eligibility techniques and operation described herein may be used for this determination.

If the content provider system determines, at operation 710, that the updated content item remains eligible for the event, the content provider system may take no actions regarding the updated content item's association with the event and, at operation 718, determine whether there are other events to evaluate. If the content provider system determines, at operation 710, that the updated content item is no longer eligible for the event, in some examples taking into account a temporal buffering period as described herein, the content provider system may, at operation 712, remove the updated content item from participation in and/or eligibility for the event or otherwise disassociate the updated content item from the event with which it was associated. The content provider system may then, at operation 718, determine whether there are other events to evaluate.

If, at operation 708, the content provider system determines that the updated content item is not currently associated with the event determined at operation 706, then at operation 714, the content provider system may evaluate the updated content item and/or its associated data for eligibility to participate in that event. In examples, the content provider system may evaluate the content item against one or more (e.g., all) of the event requirements and/or parameters to determine eligibility. Alternatively, the content provider system may evaluate (e.g., only) the updated or modified content item data against one or more corresponding event requirements and/or parameters. Here again, any of the content item eligibility techniques and operation described herein may be used for this determination.

If, at operation 714, the content provider system determines that the updated content item is now eligible for participation in the event, at operation 716 the content provider system may query the vendor system associated with the updated content item for participation in the event or otherwise solicit the vendor system for association of the updated content item with the event, for example, using any of the event participation solicitation techniques and operation described herein. If the content provider system determines, at operation 714, that the updated content item is not eligible for the event, the content provider system may take no actions regarding the updated content item's association with the event. At operation 718, the content provider system may determine whether there are other events to evaluate.

If, at operation 718, the content provider system determines that there are one or more other events to evaluate on behalf of the updated content item, the process 700 may return to operation 706 to determine a subsequent event for which to evaluate the updated content item for eligibility. If the content provider system determines that are no remaining events for which to evaluate the updated content item for eligibility, at operation 720 the content provider system may update content item data and/or event data based on the process 700.

Figure 8:
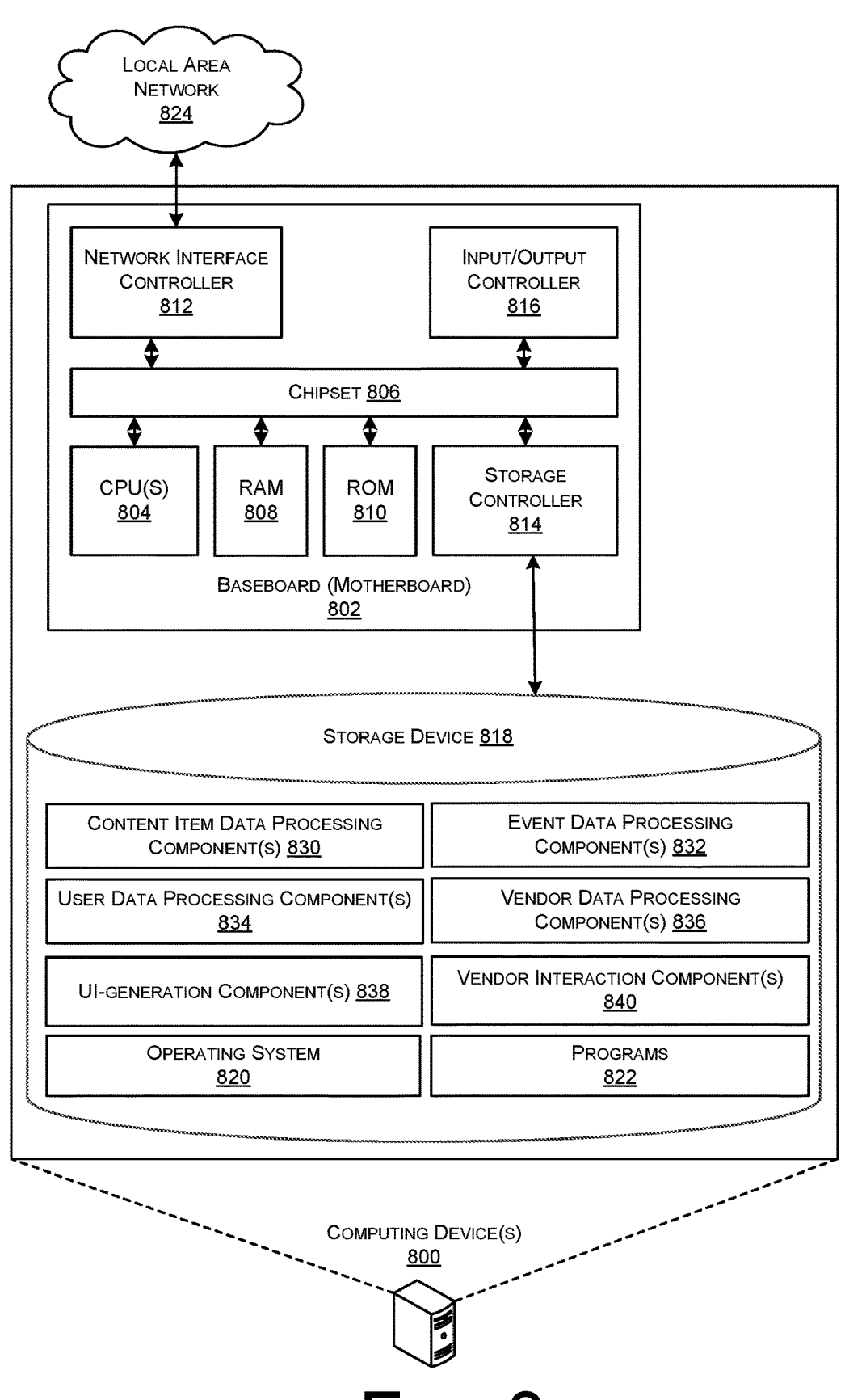
FIG. 8 is a computer architecture diagram showing an example computer hardware architecture for implementing computing devices configured to implement the techniques described herein.

FIG. 8 is a computer architecture diagram showing an illustrative computer hardware architecture for implementing a device 800 that can be utilized to implement aspects of the various technologies presented herein. The computing systems 108, 208, and/or 308, vendor systems 202 and/or 303, and/or the client devices 102, and/or 302 described herein may include some or all of the components discussed below with reference to the device 800.

The computing resources described herein may be provided by a cloud computing network, data center, or the like can be data processing resources such as virtual machine (VM) instances or hardware computing systems, database clusters, computing clusters, storage clusters, data storage resources, database resources, networking resources, and others. Some of the devices 800 can also be configured to execute a resource manager capable of instantiating and/or managing the computing resources. In the case of VM instances, for example, the resource manager can be a hypervisor, or another type of program configured to enable the execution of multiple VM instances on a single server device 800. Devices 800 in a data center can also be configured to provide network services and other types of services.

The device 800 includes a baseboard 802, or "motherboard," which is a printed circuit board to which a multitude of components or devices can be connected by way of a system bus or other electrical communication paths. In one illustrative configuration, one or more central processing units (CPUs) 804 operate in conjunction with a chipset 806. The CPUs 804 can be standard programmable processors that perform arithmetic and logical operations necessary for the operation of the device 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the device 800. The chipset 806 can further provide an interface to a computer-readable storage medium such as a read-only memory (ROM) 810 or non-volatile RAM (NVRAM) for storing basic routines that help to startup the device 800 and to transfer information between the various components and devices. The ROM 810 or NVRAM can also store other software components necessary for the operation of the device 800 in accordance with the configurations described herein.

The device 800 can operate in a networked environment using logical connections to remote computing devices and computer systems through a network, such as a local area network 824. The chipset 806 can include functionality for providing network connectivity through a Network Interface Card (NIC) 812, such as a gigabit Ethernet adapter. The NIC 812 is capable of connecting the device 800 to other computing devices over the network. It should be appreciated that multiple NICs 812 can be present in the device 800, connecting the computer to other types of networks and remote computer systems.

The device 800 can be connected to a storage device 818 that provides non-volatile storage for the computer. The storage device 818 can store an operating system 820, programs 822, and data, which have been described in greater detail herein. The storage device 818 can be connected to the device 800 through a storage controller 814 connected to the chipset 806. The storage device 818 can consist of one or more physical storage units. The storage controller 814 can interface with the physical storage units through a serial attached SCSI (SAS) interface, a serial advanced technology attachment (SATA) interface, an FC interface, or other type of interface for physically connecting and transferring data between computers and physical storage units.

The device 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the device 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 800 can further read information from the storage device 818 by detecting the physical states or characteristics of one or more particular locations within the physical storage units.

In addition to the mass storage device 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the device 800.

In one embodiment, the storage device 818 or other computer-readable storage media is encoded with computer-executable instructions which, when loaded into the device

800, transform the computer from a general-purpose computing system into a special-purpose computer capable of implementing the embodiments described herein. These computer-executable instructions transform the device 800 by specifying how the CPUs 804 transition between states, as described above. According to one embodiment, the device 800 has access to computer-readable storage media storing computer-executable instructions which, when executed by the device 800, perform the various processes described above with regard to FIGS. 4-7. The device 800 can also include computer-readable storage media having instructions stored thereupon for performing any of the other computer-implemented operations described herein.

The device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the device 800 might not include all of the components shown in FIG. 8, can include other components that are not explicitly shown in FIG. 8, or might utilize an architecture completely different than that shown in FIG. 8.

The device 800 may also, or instead, store, in the storage device 818, one or more of a content item data processing component 830 that may include one or more components that may perform content item data processing operations, such as, but not limited to, those described herein in regard to eligible content item determination components 216 and 316, content item data determination component 318, event content item determination components 116 and 320, and FIGS. 4-7.

The device 800 may also, or instead, store, in the storage device 818, one or more of an event data processing component 832 that may include one or more components that may perform event data processing operations, such as, but not limited to, those described herein in regard to event content item determination components 116 and 320, presentation content item determination component 120, event participation query component 220, eligible content item determination components 216 and 316, and FIGS. 4-7.

The device 800 may also, or instead, store, in the storage device 818, one or more of a user data processing component 834 that may include one or more components that may perform user data processing operations, such as, but not limited to, those described herein in regard to user content item preferences determination component 118 and FIGS. 4-7.

The device 800 may also, or instead, store, in the storage device 818, one or more of a vendor data processing component 836 that may include one or more components that may perform vendor data processing operations, such as, but not limited to, those described herein in regard to vendor determination component 218 and FIGS. 4-7.

The device 800 may also, or instead, store, in the storage device 818, one or more of a UI-generation component 838 that may include one or more components that may perform UI generation operations, such as, but not limited to, those described herein in regard to UI-generation components 122 and 322 and FIGS. 4-7.

The device 800 may also, or instead, store, in the storage device 818, one or more of a vendor interaction component 840 that may include one or more components that may perform vendor interaction operations, such as, but not limited to, those described herein in regard to vendor interaction component 222 and FIGS. 4-7.

The device 800 may also, or instead, store, in the storage device 818, one or more additional elements described above with reference to FIGS. 1-7.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:

determining, at a content provider computing system, event parameters and a plurality of available content item positions for an event;

determining, at the content provider computing system, a plurality of content items from a content item catalog that correspond to the event parameters;

transmitting, from the content provider computing system, first event participation queries to first content generation systems associated with a first subset of the plurality of content items;

receiving, at the content provider computing system, first event participation response data associated with the first event participation queries;

generating, at the content provider computing system and based at least in part on the first event participation response data, an event data structure associating one or more of the first subset of the plurality of content items with one or more respective first content item positions of the plurality of available content item positions;

transmitting, from the content provider computing system and based at least in part on the event data structure and one or more remaining content item positions of the plurality of available content item positions, second event participation queries to second content generation systems associated with a second subset of the plurality of content items;

receiving, at the content provider computing system, second event participation response data associated with the first event participation queries;

updating, at the content provider computing system and based at least in part on the second event participation response data, the event data structure to associate one or more of the second subset of the plurality of content items with one or more respective second content item positions of the plurality of available content item positions;

determining tags associated with content items previously consumed by a user by analyzing user content consumption history data stored in computer memory to identify specific content item attributes;

determining, from the tags, a tag that has been least frequently applied to content items in the content item catalog by executing a tag frequency analysis algorithm that computes occurrence counts for each tag across the content item catalog and identifies tags with occurrence counts below a predetermined threshold;

determining, from the plurality of content items represented in the event data structure, one or more content items associated with the tag by performing a database query operation that matches tag identifiers in the event data structure with the identified least frequently applied tag; and transmitting instructions to a user computing device of the user, the instructions causing the user computing device to display a user interface comprising the one or more content items wherein the user interface is dynamically generated by a UI-generation component that processes the event data structure and user preference data to create customized display elements for presentation on a display screen.

2. The method of claim 1, wherein the tag is a first tag, and wherein determining the plurality of content items that correspond to the event parameters comprises determining that individual items of the plurality of content items are associated with a second tag that is indicated by the event parameters.

3. The method of claim 1, wherein the event parameters comprise one or more of:

a minimum discount;

a required discount;

a preferred vendor status;

an event recruitment period; or an event time period.

4. The method of claim 1, wherein at least one content item of the first subset of the plurality of content items is included in the second subset of the plurality of content items.

5. The method of claim 1, wherein at least one of the first event participation queries and the second event participation queries request a responsive indication of a content item position from among the plurality of available content item positions.

6. The method of claim 1, wherein at least one of the first event participation queries and the second event participation queries request a responsive indication of a preferred content item sales discount.

7. One or more non-transitory computer-readable media storing computer-executable instructions that, when executed, cause one or more processors to perform operations comprising:

determining event parameters and a plurality of available content item positions for an event;

determining a plurality of content items from a content item catalog that correspond to the event parameters;

transmitting first event participation queries to first content generation systems associated with a first subset of the plurality of content items;

receiving first event participation response data associated with the first event participation queries;

associating one or more of the first subset of the plurality of content items with one or more respective first content item positions of the plurality of available content item positions in an event data structure;

transmitting, based at least in part on the event data structure and one or more remaining content item positions of the plurality of available content item positions, second event participation queries to second content generation systems associated with a second subset of the plurality of content items;

receiving second event participation response data associated with the first event participation queries;

associating one or more of the second subset of the plurality of content items with one or more respective second content item positions of the plurality of available content item positions in the event data structure;

determining tags associated with content items previously consumed by a user by analyzing user content consumption history data stored in computer memory to identify specific content item attributes;

determining, from the tags, a tag that has been least frequently applied to content items in the content item catalog by executing a tag frequency analysis algorithm that computes occurrence counts for each tag across the content item catalog and identifies tags with occurrence counts below a predetermined threshold;

determining, from the plurality of content items represented in the event data structure, one or more content items associated with the tag by performing a database query operation that matches tag identifiers in the event data structure with the identified least frequently applied tag; and transmitting instructions to a user computing device of the user, the instructions causing the user computing device to display a user interface comprising the one or more content items wherein the user interface is dynamically generated by a UI-generation component that processes the event data structure and user preference data to create customized display elements for presentation on a display screen.

8. The one or more non-transitory computer-readable media of claim 7, wherein determining the plurality of content items that correspond to the event parameters comprises determining that individual items of the plurality of content items are associated with at least one of:

a tag count that meets or exceeds a minimum tag count indicated by the event parameters; or a tag weight that meets or exceeds a minimum tag weight indicated by the event parameters.

9. The one or more non-transitory computer-readable media of claim 7, wherein the tag is a first tag, and wherein determining the plurality of content items that correspond to the event parameters comprises determining that individual items of the plurality of content items are associated with a second tag assigned by a respective content generation system that is indicated by the event parameters.

10. The one or more non-transitory computer-readable media of claim 7, wherein the operations further comprise:

ordering the plurality of content items represented in the event data structure based on at least one of global content item sales or regional content item sales to obtain ordered content items, wherein the user interface further comprises at least one of the ordered content items.

11. The one or more non-transitory computer-readable media of claim 7, wherein the operations further comprise:

determining, from the plurality of content items represented in the event data structure, at least one content item based at least in part on a region associated with the user, wherein the user interface further comprises the at least one content item.

12. A system comprising:

one or more computer processors; and one or more computer-readable media storing computer-executable instructions that, when executed, cause the one or more computer processors to perform operations comprising:

determining event parameters and a plurality of available content item positions for an event;

determining a plurality of content items from a content item catalog that correspond to the event parameters;

transmitting first event participation queries to first content generation systems associated with a first subset of the plurality of content items;

receiving first event participation response data associated with the first event participation queries;

generating, based at least in part on the first event participation response data, an event data structure associating one or more of the first subset of the plurality of content items with one or more respective first content item positions of the plurality of available content item positions;

transmitting, based at least in part on the event data structure and one or more remaining content item positions of the plurality of available content item positions, second event participation queries to second content generation systems associated with a second subset of the plurality of content items;

receiving second event participation response data associated with the first event participation queries;

updating, based at least in part on the second event participation response data, the event data structure to associate one or more of the second subset of the plurality of content items with one or more respective second content item positions of the plurality of available content item positions;

determining tags associated with content items previously consumed by a user by analyzing user content consumption history data stored in computer memory to identify specific content item attributes;

determining, from the tags, a tag that has been least frequently applied to content items in the content item catalog by executing a tag frequency analysis algorithm that computes occurrence counts for each tag across the content item catalog and identifies tags with occurrence counts below a predetermined threshold;

determining, from the plurality of content items represented in the event data structure, one or more content items associated with the tag by performing a database query operation that matches tag identifiers in the event data structure with the identified least frequently applied tag; and transmitting instructions to a user computing device of the user, the instructions causing the user computing device to display a user interface comprising the one or more content items wherein the user interface is dynamically generated by a UI-generation component that processes the event data structure and user preference data to create customized display elements for presentation on a display screen.

13. The system of claim 12, wherein the tag is a first tag, and wherein determining the plurality of content items that correspond to the event parameters comprises determining that individual items of the plurality of content items are associated with a second tag that is indicated by the event parameters.

14. The system of claim 12, wherein the event parameters comprise one or more of:

a minimum discount;

a required discount;

a preferred vendor status;

an event recruitment period; or an event time period.

15. The system of claim 12, wherein at least one content item of the first subset of the plurality of content items is included in the second subset of the plurality of content items.

16. The system of claim 12, wherein at least one of the first event participation queries and the second event participation queries request a responsive indication of a content item position from among the plurality of available content item positions.

17. The system of claim 12, wherein at least one of the first event participation queries and the second event participation queries request a responsive indication of a preferred content item sales discount.

18. The one or more non-transitory computer-readable media of claim 7, wherein the event parameters comprise one or more of:

a minimum discount;

a required discount;

a preferred vendor status;

an event recruitment period; or an event time period.

19. The one or more non-transitory computer-readable media of claim 7, wherein at least one content item of the first subset of the plurality of content items is included in the second subset of the plurality of content items.

20. The method of claim 1, wherein determining the plurality of content items that correspond to the event parameters comprises determining that individual items of the plurality of content items are associated with at least one of:

a tag count that meets or exceeds a minimum tag count indicated by the event parameters; or a tag weight that meets or exceeds a minimum tag weight indicated by the event parameters.

* * * * *